(12) United States Patent
Zhong et al.

(10) Patent No.: US 10,186,008 B2
(45) Date of Patent: Jan. 22, 2019

(54) STEREOSCOPIC VIEW PROCESSING

(71) Applicant: QUALCOMM Incorporated, San Diego, CA (US)

(72) Inventors: Gang Zhong, San Diego, CA (US); Vineet Goel, La Jolla, CA (US); Young In Yeo, Orlando, FL (US); Juraj Obert, Orlando, FL (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 14/855,962

(22) Filed: Sep. 16, 2015

(65) Prior Publication Data

US 2016/0350892 A1    Dec. 1, 2016

Related U.S. Application Data

(60) Provisional application No. 62/167,746, filed on May 28, 2015.

(51) Int. Cl.
| | | |
|---|---|---|
| *G06T 15/00* | (2011.01) | |
| *G06T 1/20* | (2006.01) | |
| *G06T 15/80* | (2011.01) | |
| *H04N 13/106* | (2018.01) | |
| *H04N 13/139* | (2018.01) | |
| *H04N 13/261* | (2018.01) | |
| *H04N 13/275* | (2018.01) | |
| *H04N 13/30* | (2018.01) | |

(52) U.S. Cl.
CPC .............. *G06T 1/20* (2013.01); *G06T 15/005* (2013.01); *G06T 15/80* (2013.01); *H04N 13/106* (2018.05); *H04N 13/139* (2018.05); *H04N 13/261* (2018.05); *H04N 13/275* (2018.05); *H04N 13/30* (2018.05)

(58) Field of Classification Search
None
See application file for complete search history.

(56) References Cited

U.S. PATENT DOCUMENTS

| 8,115,802 B2 | 2/2012 | Nakaya |
| 8,279,222 B2 | 10/2012 | Swaminathan et al. |
| 8,917,271 B2 | 12/2014 | Rhoades et al. |
| 2008/0007559 A1 | 1/2008 | Kalaiah et al. |
| 2012/0235999 A1* | 9/2012 | Bi .................... G06T 15/005 345/426 |
| 2013/0093767 A1 | 4/2013 | Booth, Jr. et al. |
| 2015/0084949 A1* | 3/2015 | Venkatesh .......... H04N 13/0275 345/419 |

OTHER PUBLICATIONS

International Search Report and Written Opinion—PCT/US2016/031676—ISA/EPO—dated Jul. 15, 2016 13 pages.
Response to Written Opinion dated Jul. 15, 2016 from International Application No. PCT/US2016/031676, filed on Oct. 20, 2016, 4 pp.
International Preliminary Report on Patentability from International Application No. PCT/US2016/031676, dated Aug. 10, 2017, 9 pp.

* cited by examiner

*Primary Examiner* — Said Broome
(74) *Attorney, Agent, or Firm* — Shumaker & Sieffert, P.A.

(57) ABSTRACT

Techniques are described for stereoscopic view generation. A graphics processing unit (GPU) may combine attribute information for two or more corresponding vertices of corresponding primitives in different views. The GPU may process the combined attributed information to generate graphics data for the stereoscopic view.

19 Claims, 12 Drawing Sheets

STEREOSCOPIC VIEW PROCESSING

This application claims the benefit of U.S. Provisional Application No. 62/167,746, filed May 28, 2015, the entire content of which is incorporated herein by reference.

TECHNICAL FIELD

This disclosure relates to graphics data processing, and more particularly, to graphics data processing for stereoscopic views.

BACKGROUND

A stereoscopic view refers to a perceived image that appears to encompass a 3-dimensional (3D) volume. To generate the stereoscopic view, a device displays two images on a 2-dimensional (2D) area of a display. These two images include substantially similar content, but with slight displacement along the horizontal axis of one or more corresponding pixels in the two images. The simultaneous viewing of these two images, on a 2D area, causes a viewer to perceive an image that is popped out of or pushed into the 2D display that is displaying the two images. In this way, although the two images are displayed on the 2D area of the display, the viewer perceives an image that appears to encompass the 3D volume.

The two images of the stereoscopic view are referred to as a left-eye image and a right-eye image, respectively. The left-eye image is viewable by the left eye of the viewer, and the right-eye image is not viewable by the left eye of the viewer. Similarly, the right-eye image is viewable by the right eye of the viewer, and the left-eye image is not viewable by the right eye of the viewer. For example, the viewer may wear specialized glasses, where the left lens of the glasses blocks the right-eye image and passes the left-eye image, and the right lens of the glasses blocks the left-eye image and passes the right-eye image.

Because the left-eye and right-eye images include substantially similar content with slight displacement along the horizontal axis, but are not simultaneously viewable by both eyes of the viewer (e.g., because of the specialized glasses), the brain of the viewer resolves the slight displacement between corresponding pixels by commingling the two images. The commingling causes the viewer to perceive the two images as an image with 3D volume.

In some cases, there may be more than two views. For instance, to accommodate for different viewer angles, there may be a plurality of views, and the viewer may see two views of these many views, one from the right-eye and the other from the left-eye.

SUMMARY

In general, the techniques described in this disclosure are directed to generating graphics primitives for a stereoscopic view. In some examples, a primitive generator receives attribute information for a first primitive and generates attribute information for at least a second primitive, but may generate attribute information for additional primitives. The first primitive is a primitive for a first view of a stereoscopic view and the second primitive is a primitive for a second view of the stereoscopic view. The additional primitives are primitives for respective additional views, when the additional views are present. In accordance with examples described in this disclosure, the primitive generator includes the attribute information for at least the second primitive into the attribute information for the first primitive (i.e., combines the attribute information of at least the second primitive with the attributed information for the first primitive).

A vertex shader program receives this combined attribute information and processes the combined attributed information to generate graphics data for the first primitive and generate graphics data for the second primitive. The vertex shader program may be specifically configured to process such combined attribute information in which the attribute information for corresponding primitives of different views of the stereoscopic view is combined together. For example, a compiler or a graphics driver wrapper may include commands into the vertex shader program to configure the vertex shader program to process such combined attribute information.

In some examples, the primitive generator may be configured to receive attribute information for one primitive and generate separate, distinct attribute information for two or more corresponding primitives, one of each of the stereoscopic views. In this example, different instances of the vertex shader program may process each of the primitives.

Whether the primitive generator generates and combines attribute information or keeps attribute information separate may be based on various factors. For example, if the vertex shader program is complex (e.g., modifying a vertex shader program requires processing time or power consumption over respective threshold), not only the position of the primitive is view dependent, or there are a relatively large number of views (e.g., a number of views of a stereoscopic view is larger than a threshold), the primitive generator may generate and keep attribute information separate. For other cases (e.g., in default), the primitive generator generates and combines attribute information of vertices of two or more primitives.

In one example, the disclosure describes a method of graphics processing, the method comprising receiving, with a graphics processing unit (GPU), first attribute information for a first vertex of a primitive of a first view, determining, with the GPU, second attribute information for a second vertex of a corresponding primitive of a second view, combining, with the GPU, the second attribute information for the second vertex of the corresponding primitive of the second view with the first attribute information for the first vertex of the primitive of the first view to generate combined attribute information, and processing, with the GPU, the combined attribute information to generate graphics data for a stereoscopic view.

In one example, the disclosure describes a device for processing graphics data, the device comprising a memory unit configured to store first attribute information for a first vertex of a primitive of a first view, and a graphics processing unit (GPU) configured to receive the first attribute information for the first vertex of the primitive of the first view, determine second attribute information for a second vertex of a corresponding primitive of a second view, combine the second attribute information for the second vertex of the corresponding primitive of the second view with the first attribute information for the first vertex of the primitive of the first view to generate combined attribute information, and process the combined attribute information to generate graphics data for a stereoscopic view.

In one example, the disclosure describes a device for processing graphics data, the device comprising a memory unit configured to store first attribute information for a first vertex of a primitive of a first view, and a graphics processing unit (GPU) comprising means for receiving the first attribute information for the first vertex of the primitive of the first view, means for determining second attribute information for a second vertex of a corresponding primitive of a second view, means for combining the second attribute information for the second vertex of the corresponding primitive of the second view with the first attribute information for the first vertex of the primitive of the first view to generate combined attribute information, and means for processing the combined attribute information to generate graphics data for a stereoscopic view.

In one example, the disclosure describes a non-transitory computer-readable storage medium having instructions stored thereon that when executed cause a graphics processing unit (GPU) to receive first attribute information for a first vertex of a primitive of a first view, determine second attribute information for a second vertex of a corresponding primitive of a second view, combine the second attribute information for the second vertex of the corresponding primitive of the second view with the first attribute information for the first vertex of the primitive of the first view to generate combined attribute information, and process the combined attribute information to generate graphics data for a stereoscopic view.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
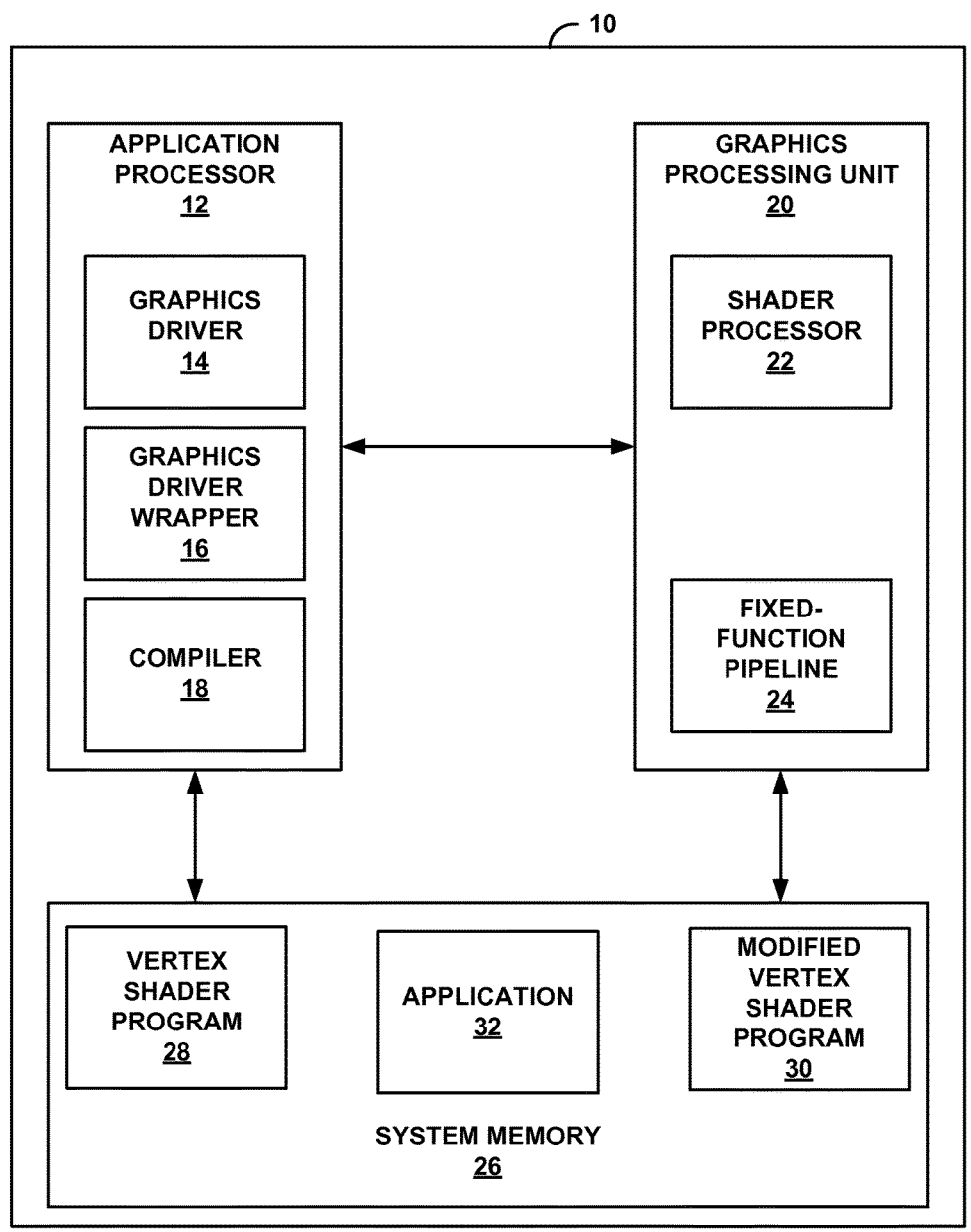
FIG. 1 is a block diagram illustrating an example of a device that may implement one or more example techniques described in this disclosure.

The example techniques described in this disclosure are directed to rendering stereoscopic 3-dimensional (S3D) graphics during execution or run time. For example, an application may generate mono view images that are to be rendered by a graphics processing unit (GPU) for display. The techniques described in this disclosure may convert the mono view images to stereoscopic view images during the execution (i.e., during run-time) of the application.

In some examples, the techniques may render S3D graphics without needing any modification to the application that created the graphics or the GPU. In other words, from the perspective of the application, the application processor executing the application may output graphics data such as attribute information for vertices of primitives and commands of the application for graphics rendering by GPU. However, it should be understood that the techniques described in this disclosure are also applicable to examples where the application, executing on the application processor, generates S3D graphics data. Examples of the attribute information for each of the vertex include the x, y, z coordinates, the red-component value, the green-component value, the blue-component value, the opacity value, and the like as a few examples of attribute information.

A primitive generator on the GPU may receive the attribute information for the vertices of a primitive and generate attribute information for vertices of a corresponding primitive. In this disclosure, the term corresponding primitive refers to the primitive in the second view that includes similar graphics content as the primitive in the first view. It is that the graphics content of the two primitives of the different views are the same that causes the viewer to perceive a 3D volume. For example, the received attribute information for vertices of a primitive may be attribute information for vertices of a primitive of a left-eye image or a right-eye image of the stereoscopic view, and the primitive generator on the GPU may generate attribute information for a corresponding primitive in the other image (e.g., if the first image is a left-eye image, the second image is a right-eye image, and vice-versa).

Although the above example is described with respect to a left-eye image and a right-eye image, there may be multiple such images. For example, there may be N views in the stereoscopic view. In such examples, the primitive generator may generate attribute information for corresponding primitives in images in the each of the N views. The limit on the number of views may be based on the amount of available attribute storage space.

The primitive generator may generate attribute information for the vertices for the corresponding primitives in the other views based on a disparity. For example, the primitive generator may add to or subtract from an x-coordinate of a vertex based on how much an object is to push in or pop out. There may be various ways in which the primitive generator may determine the attribute information for the vertices of corresponding primitives in the other views, and the techniques described in this disclosure are not limited to any specific way to determine the attribute information.

In some examples, the primitive generator may include the generated attribute information for the corresponding primitives in the other views in the attribute information for the primitive for which the information was received (i.e., combine the generated attribute information of the corresponding primitives in the other views with the attributed information for the primitive for which the information was received). For example, for each vertex, there may be X number of storage locations reserved for each of its attributes. However, not all X storage locations may be utilized. In some examples, the primitive generator may utilize any unused storage locations of a vertex of a primitive in a first view to store attribute information of a vertex of a corresponding primitive in a second view.

The primitive generator does not necessarily generate the combined attribute information in all examples. In some examples, the primitive generator may generate separate, distinct attribute information for the vertices of the corresponding primitives of the different views. For instance, the primitive generator may receive attribute information for vertices of a primitive and generate attribute information vertices of corresponding primitives. However, rather than combining the attribute information of corresponding primitives, the primitive generator may keep the attribute information separate and distinct.

In both examples (e.g., where the attribute information is kept separate and where the attribute information is combined), the primitive generator may output the attribute information to a vertex shader program. In examples where the primitive generator combines the attribute information, the GPU may execute one instance of the vertex shader program for each set of combined attribute information. Because the combined attribute information includes attribute information for multiple vertices, fewer instances of the vertex shader program may need to execute. For example, rather than two instances, one for a vertex of the primitive in one view and another for a corresponding vertex of a corresponding primitive in another view, the execution of one instance of the vertex shader program may process the attribute information for both vertices because the attribute information is combined.

In some examples, the vertex shader program may have been designed to process attribute information for only vertex and not to process such combined attributed information. In the techniques described in this disclosure, a graphics driver wrapper or a compiler executing on the application processor (e.g., a CPU) may modify the instructions of the vertex shader program so that the modified vertex shader program is configured to process the combined attribute information.

Based on the above description, this disclosure describes two ways in which to generate graphics data for stereoscopic view. In the first way, a primitive generator combines attribute information of two or more vertices that correspond to different views, and a single instance of the vertex shader program is able to process these multiple vertices of different views. In the second way, a primitive generator keeps the attribute information of different vertices of different view separate, and execution of multiple instances of the vertex shader program may be needed (e.g., one per vertex).

There may be various factors that determine whether the primitive generator combines the attribute information of corresponding vertices of corresponding primitives of different views or keeps the attribute information of corresponding vertices of corresponding primitives of different views separate. As one example, if there are a relative large number of views (e.g., a number of views of a stereoscopic view is larger than a threshold), then there may be insufficient storage locations available to combine the attribute information, and therefore, the attribute information may be kept separate. Also, in some examples, if only the vertex coordinates (e.g., the x-coordinate) of the vertices of corresponding primitives is different, and all other attribute information of vertices of corresponding primitives is the same, then the primitive generator may combine the attribute information.

If view position is not the only part that is different (e.g., one or more of the RGB values or opacity are also different), then primitive generator may keep the attribute information separate. As another example, if modifying the vertex shader program is complex (e.g., modifying a vertex shader program requires processing time or power consumption over respective threshold), then the primitive generator may not combine the attribute information. In general, combining the attribute information may be the default setting, and if one of the above conditions exists, then the primitive generator may keep the attribute information separate.

FIG. 1 is a block diagram illustrating an example of a device that may implement one or more example techniques described in this disclosure. As illustrated in FIG. 1, device 10 may include application processor 12 (e.g., a central processing unit (CPU)), graphics processing unit (GPU) 20, and system memory 26. Device 10 may include components in addition to those illustrated in FIG. 1.

Moreover, in some examples, application processor 12 and GPU 20 may be formed as a common integrated circuit that is housed within a single circuit package (e.g., formed as a common processor). However, aspects of this disclosure are not so limited, and one or more of application processor 12 and GPU 20 may be separate integrated circuits that are housed in separate circuit packages.

Application processor 12 may be the central processing unit (CPU) of device 10. GPU 20 may be a processing unit configured to output graphics data for presentation on a display. Examples of application processor 12 and GPU 20 include, but are not limited to, a digital signal processor (DSP), a general purpose microprocessor, application specific integrated circuit (ASIC), field programmable logic array (FPGA), or other equivalent integrated or discrete logic circuitry.

In some examples GPU 20 may be specialized hardware that is specifically designed for fast parallel (e.g., at the same time) processing. For example, graphics processing may require fast parallel processing, and therefore, GPU 20 may be better suited for processing graphics data as compared to application processor 12. It may be possible for GPU 20 to perform tasks in addition to graphics processing, such as general processing task. Accordingly, GPU 20 may be considered as a general processing GPU (GPGPU). The techniques described in this disclosure may apply to examples where GPU 20 performs only graphics related tasks or examples where GPU 20 is a GPGPU.

System memory 26 is an example of a computer-readable storage medium. For example, system memory 26 may include instructions that cause application processor 12 and GPU 20 to perform functions ascribed to each in this disclosure. System memory 26 can be considered as a computer-readable storage medium comprising instructions that cause one or more processors (e.g., application processor 12 or GPU 20) to perform various functions.

Examples of system memory 26 include, but are not limited to, a random access memory (RAM), a read only memory (ROM), an electrically erasable programmable read-only memory (EEPROM), CD-ROM or other optical disk storage, magnetic disk storage, or other magnetic storage devices, flash memory, or any other medium that can be used to carry or store desired program code in the form of instructions or data structures and that can be accessed by a computer or a processor. System memory 26 may, in some examples, be considered as a non-transitory storage medium. The term "non-transitory" may indicate that the storage medium is not embodied in a carrier wave or a propagated signal. However, the term "non-transitory" should not be interpreted to mean that system memory 26 is non-movable. As one example, system memory 26 may be removed from device 10, and moved to another device. As another example, a storage device, substantially similar to system memory 26, may be inserted into device 10. In certain examples, a non-transitory storage medium may store data that can, over time, change (e.g., in RAM).

GPU 20 includes shader processor 22 and fixed-function pipeline 24. Shader processor 22, sometimes referred to as a shader core, may be a core of GPU 20 upon which shader programs such as vertex shader programs and fragment shader programs execute. Fixed-function pipeline 24 may include hardware units that perform fixed functions. In other words, the shader programs such as vertex shader programs and fragment shader programs may be software units that execute on shader processor 22 and allow for functional flexibility, whereas fixed-function pipeline 24 includes hardware units with fixed functions and minimal functional flexibility.

For example, some earlier versions of GPU included only fixed-function units in a graphics pipeline. In GPU 20, the fixed-function graphics pipeline of earlier version of the GPU is partially replaced by vertex shader programs, such as vertex shader program 28, a fragment shader programs, and/or other types of shader programs. For example, vertex shader program 28 may perform functions such as model view transformation, lighting, and projection, which were performed by fixed-function units in earlier versions of GPUs. The fragment shader programs may perform the functions of the fragment stage of the fixed-function units in earlier versions of GPUs.

Application processor 12 may execute one or more applications, such as application 32, stored in system memory 26. Examples of application 32 include, but are not limited to, web browsers, user interfaces, e-mail applications, spreadsheet applications, word processing applications, graphics authoring applications, video games, or other applications that generate viewable objects for display. For instance, application 32 may be a video game that when executed outputs graphics content that is displayed on a display.

In some examples, but not necessarily in all examples, application 32 may be designed by a developer for mono view. For example, application 32, upon execution, may generate 3D graphics content, where the 3D graphics content is constrained to the 2D area of the display. Application 32, upon execution on application processor 12, may divide the generated 3D graphics content into primitives such as triangles, rectangles, or other types of polygons. Each of these primitives may include pixels that are to be displayed on the display. For example, these primitives may form the objects within the image. Application 32, upon execution on application processor 12, may also assign pixel values to each of the vertices of the primitives. For example, the pixel values may include 3D coordinates of the vertices, color values of the vertices, and transparency values of the vertices. The pixel values need not include all of the above example components in every aspect of this disclosure.

In other words, application 32, executing on application processor 12, may generate attribute information for vertices of the primitives. Examples of the attribute information includes x, y, z-coordinates for the vertices, color component values (e.g., RGB values), opacity values, and the like.

Application processor 12 may then forward the attribute information (i.e., pixel values) for the vertices to GPU 20 for further processing. For example, application processor 12 may include graphics driver 14, which may be software executing on application processor 12. Application processor 12, via graphics driver 14, may be configured to transmit commands to GPU 20, and in response, GPU 20 may perform functions in accordance with the received commands. For example, graphics driver 14 functions as an interface between GPU 20 and application processor 12. When application processor 12 issues a command to GPU 20, it is through graphics driver 14 that GPU 20 receives the command. For instance, application 32, executing on application processor 12, may instruct GPU 20 to perform a particular task. In this case, graphics driver 14 may receive the instruction from application 32 for the particular task, and application processor 12 may provide the instruction to GPU 20. In response, GPU 20 may perform the task.

In some examples, graphics driver 14 may be designed in accordance with a specific application programming interface (API). For example, graphics driver 14 may be designed according to the OpenGL or OpenGL ES (embedded system) APIs, which are APIs of the Khronos Group and their specifications are available publicly. However, the techniques of this disclosure may be extendable to the Microsoft DirectX system, such as DirectX 9, 10, or 11, or any other shader-based graphics system and APIs. For purposes of illustration, the techniques of this disclosure are described in the context where the API is the OpenGL ES 2.0 API. However, aspects of this disclosure are not so limited, and can be extended to other APIs or shader-based graphics systems.

To render the primitives received from application processor 12, shader processor 22 of GPU 20 may execute one or more shader programs such as vertex shader programs and fragment shader programs to generate the pixel values for the pixels of a display. A developer may develop these vertex shader programs and fragment shader programs in accordance with an API, such as the OpenGL ES 2.0 API used in this disclosure for illustration purposes. The source code for these vertex and fragment shader programs may be stored in system memory 26.

For example, application 32 may utilize vertex shader program 28, which may be configured to operate on the image of the mono view generated by application 32. The pixel values of the image of the mono view generated by application 32 may need to be processed by shader processor 22 using vertex shader program 28. As one example, vertex shader program 28 may be a vertex shader program particularly called by application 32 during the execution of application 32 on application processor 12. Vertex shader program 28 may execute on shader processor 22 of GPU 20, and application 32 may execute on application processor 12, but vertex shader program 28 and application 32 may be interrelated for the purposes of displaying the images generated by application 32.

The source code of vertex shader program 28 may be stored in system memory 26. Application processor 12 may retrieve the source code of vertex shader program 28 and provide the source code for vertex shader program 28 to compiler 18. Compiler 18 may compile the source code of vertex shader program 28 to generate object code of vertex shader program 28, and store the object code in system memory 26. Application processor 12, via graphics driver 14, may then instruct GPU 20 to retrieve the object code of vertex shader program 28 from system memory 26, and instruct GPU 20 to execute the object code of vertex shader program 28 on shader processor 22. Shader processor 22 may then execute the object code of vertex shader program 28 to process the pixel values for the vertices generated by the execution of application 32. GPU 20, in conjunction with fixed-function pipeline 24 and shader processor 22, may generate the graphics content for application 32 for display.

Although system memory 26 is shown to store source code for only one vertex shader program 28, aspects of this disclosure are not so limited. For example, application 32 may possibly utilize multiple different vertex shader programs, and the source code for each of these vertex shader programs may be stored in system memory 26. For example, the vertex shader programs may be content dependent and even scene dependent, and application 32 may utilize a particular shader based on the content or scene of the image that is to be rendered. Also, application 32 may require execution of multiple instantiations of vertex shader program 28. For example, shader processor 22 may execute multiple instantiations of vertex shader program 28 at the same time (e.g., in parallel), where each instantiation of vertex shader program 28 performs substantially similar functions, but on different pixel values. System memory 26 may similarly store source code for fragment shader programs. Graphics driver 14 may retrieve the source code for the fragment shader programs, and compiler 18 may compile the source code to generate object code for the fragment shader programs in a manner similar to that described above for vertex shader program 28.

In the techniques described in this disclosure, application processor 12 may output attribute information for a vertex of primitive, and GPU 20 may utilize the attribute information to generate attribute information for corresponding primitives in different views. For instance, the attribute information for a vertex that application processor 12 generates may be considered as attribute information for a vertex of a primitive in a first view of a stereoscopic view (e.g., left-eye view or right-eye view). GPU 20 may utilize the attribute information to generate attribute information for at least one corresponding primitive in a second view of the stereoscopic view (e.g., the other one of the left-eye view or the right-eye view). Although the above example describes there being two views, in some examples there may be many views, and GPU 20 may generate attribute information for vertices in these corresponding primitives in the different views.

As described in more detail, GPU 20 may receive the first attribute information for a vertex of a primitive of a first view, and determine second attribute information for a corresponding second vertex of a corresponding primitive of a second view (e.g., determine the second attribute information for the corresponding second vertex by receiving the information or by adding a value to a coordinate of the first vertex of the first view to determine the second attribute information for the corresponding second vertex). Corresponding primitive refers to the primitive in the second view that includes similar graphics content as the primitive in the first view. For example, the corresponding primitive in the second view may be a displaced version of the corresponding primitive in the first view.

In a first mode of operation, GPU 20 may combine the second attribute information of the second vertex of the second view with the first attribute information of the first vertex of the first view so that in effect there is only one set of attribute information that is processed. For example, GPU 20 may reserve a certain amount of storage space in the local memory of GPU 20 (as one example, but utilizing memory space in system memory 26 is also possible). If the attribute information for a vertex of a primitive of the first view does not utilize all of the reserved space, there may be some additional available, unused space. GPU 20 may utilize this available, unused space for storage of attribute information for the vertex of a primitive of the second view. In this way, the area in memory reserved for storing attribute information for a vertex of a primitive of the first view also stores attribute information for a vertex of a primitive of the second view.

In a second mode of operation, GPU 20 may not combine the attribute information. In this mode of operation, GPU 20 may receive attribute information for one vertex of one primitive of one view, and determine attribute information for a vertex of a primitive of another view. However, rather than combining the attribute information together, GPU 20 may keep the attribute information separate, and process the attribute information separately, rather than jointly as in the first mode of operation.

It should be understood that the first mode of operation and the second mode of operation are described for purposes of illustration and should not be considered limiting. In some examples, GPU 20 may only implement the first mode of operation, and not implement the second mode of operation, or vice-versa. In some examples, GPU 20 may be configured to implement both the first mode of operation and the second mode of operation, and selectively implement one of the modes of operation. In the techniques described in this disclosure, GPU 20 may be configured to implement the first mode of operation as a default. However, if certain conditions are met, as described below, then GPU 20 may implement the second mode of operation.

As described in more detail below, GPU 20 may include a primitive generator that is configured to determine the respective attribute information for respective vertices of corresponding primitives in a plurality of views. The primitive generator may utilize any techniques to determine the attribute information such as receiving such information or adding or subtracting different values from the x-coordinate of the vertex for which the attribute information is received to determine respective attribute information for vertices of corresponding primitives in the plurality of views. It should be understood that the techniques for determining attribute information for the vertices of the corresponding primitives in the different views is described for ease of illustration only and should not be considered limiting.

In some examples, the primitive generator may combine the attribute information for the primitives in the other views with the received attribute information to generate combined attribute information. However, in some examples, the primitive generator may keep the attribute information for the vertices of the different primitives separate. The conditions for whether the primitive generator combines the attribute information or keeps the attribute information separate is described in more detail.

In examples where the primitive generator combines the attribute information, vertex shader program 28 may not be configured to process such combined attribute information. In such examples, compiler 18 or graphics driver wrapper 16 may be configured to add (e.g., include) instruction in vertex shader program 28 to generate modified vertex shader program 30. The instructions added in vertex shader program 28 to generate modified vertex shader program 30 may cause modified vertex shader program 30, when executed, to process the combined attribute information. In other words, graphics driver wrapper 16 or compiler 18 may configure vertex shader program 28 to generate modified vertex shader program 30 so that modified vertex shader program 30 is capable of processing the combined attribute information when executed.

Shader processor 22 may selectively execute vertex shader program 28 or modified vertex shader program 30 based on whether the primitive generator outputs combined attribute information or separated attribute information. For combined attribute information, shader processor 22 may execute modified vertex shader program 30. For separate attribute information, shader processor 22 may execute vertex shader program 28.

In examples where the primitive generator outputs combined attribute information, shader processor 22 may execute one instance of modified vertex shader program 30 to process the combined attribute information, where the combined attribute information includes attribute information for a plurality of vertices each vertex being for a primitive in different views. In examples where the primitive generator outputs separated attribute information for the vertices, shader processor 22 may execute multiple instances of vertex shader program 28 to process the vertices of the plurality of vertices each vertex being for a primitive in different views.

By combining the attribute information of multiple vertices of different primitives of different views, the number of executions of modified vertex shader program 30 may be reduced and the number of draw calls that application processor 12, via application 32, needs to issue may be reduced. For instance, one way to generate stereoscopic view may be to execute two draw calls to generate graphics data for a first view and then for a second view. With the techniques described in this disclosure, only one draw call may be needed, and the graphics data for the stereoscopic view is generated on-the-fly.

However, as described above, the primitive generator may not combine attribute information in all cases. For instance, if there are a relative large number of views to process for generating the stereoscopic view (e.g., a number of views of a stereoscopic view is larger than a threshold), then there may not be sufficient storage space to include all of the combined attribute information for the vertices of the primitives in the different views. In such examples, the primitive generator may not combine the attribute information. As another example, if modifying vertex shader program 28 is relatively complex (e.g., modifying a vertex shader program requires processing time or power consumption over respective threshold), then the primitive generator may not combine the attribute information.

Also, in some examples, the coordinates of the vertices of the primitives in the different views may be different and all other attribute information may be the same. For example, application 32, via execution on application processor 12, may generate color values, an opacity value, and coordinates for a vertex of a primitive. In some cases, the only difference between the attribute information for this vertex and a corresponding vertex in another view is the coordinate value such as the x-coordinate. All other attribute information such as color values and the opacity value may be the same. In some examples, if the only difference between vertices of corresponding primitives in the different views is the coordinates (e.g., x-coordinate), then the primitive generator may combine the attribute information. If, however, there are other differences in the attribute information (e.g., different color values or opacity values), then the primitive generator may keep the attribute information for the different vertices separate.

Figure 2:
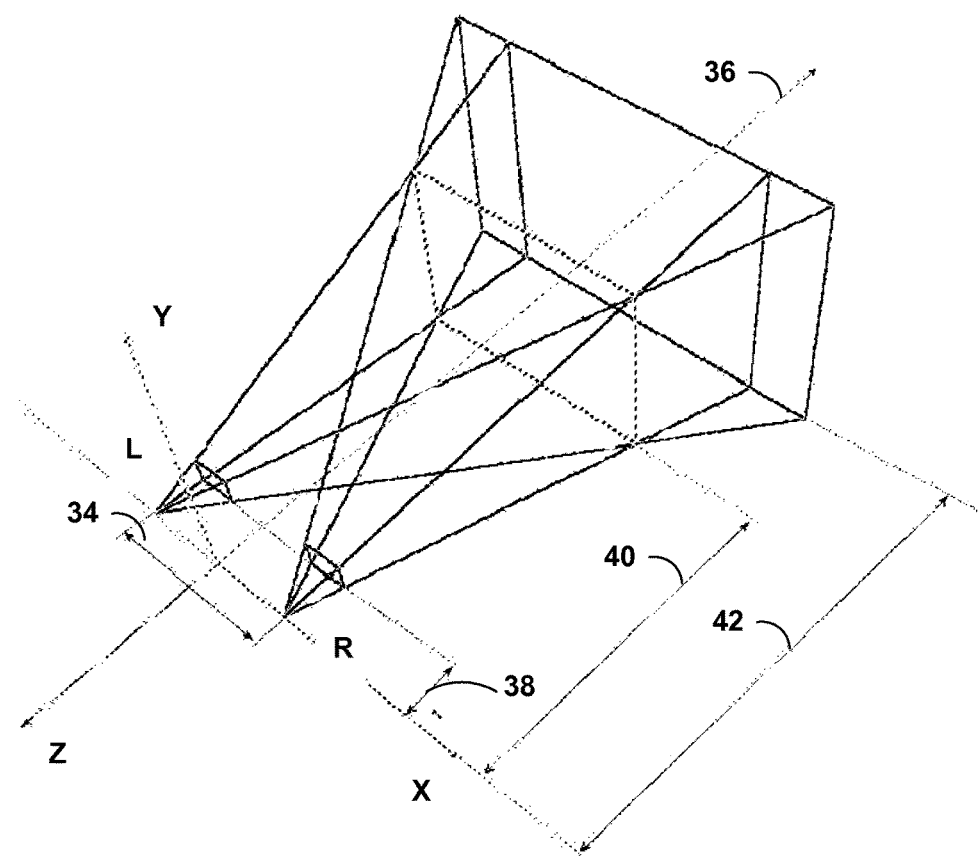
FIG. 2 is a conceptual diagram illustrating an example of stereoscopic view.

FIG. 2 is a conceptual diagram illustrating an example of stereoscopic view. FIG. 2 illustrates the left and right eye of the viewer, labeled as L and R, respectively. The left and right eye are separated by eye separation 34. The origin of the various planes illustrated in FIG. 2 is between the eyes (e.g., half of eye separation 34). View direction 36 illustrates the viewing direction of the viewer.

Near clipping distance 38 is close to the viewer's eyes and defines how close an object can appear to the viewer. Far clipping distance 42 is far from the viewer's eyes and defines how far an object can appear to the viewer. Convergence distance 40 illustrates the proximate location of the display that is displaying the graphics content.

In the techniques described in this disclosure, GPU 20 may be configured to generate graphics content that is displayed somewhere between near clipping distance 38 and far clipping distance 42. For example, the difference in the x-coordinate between a vertex of a primitive in the first view and a corresponding vertex of a corresponding primitive in the second view defines where the graphics content will appear between near clipping distance 38 and far clipping distance 42.

This disclosure describes example ways in which the graphics content for the stereoscopic view is generated. For instance, in some examples, GPU 20 may combine the attribute information of vertices of corresponding primitives of different views, and process this combined attribute information via one instance of modified vertex shader program 30. In some examples, GPU 20 may keep the attribute information of vertices of corresponding primitives of different views separate, and process each of the vertices via multiple instances of vertex shader program 28.

Figure 3A:
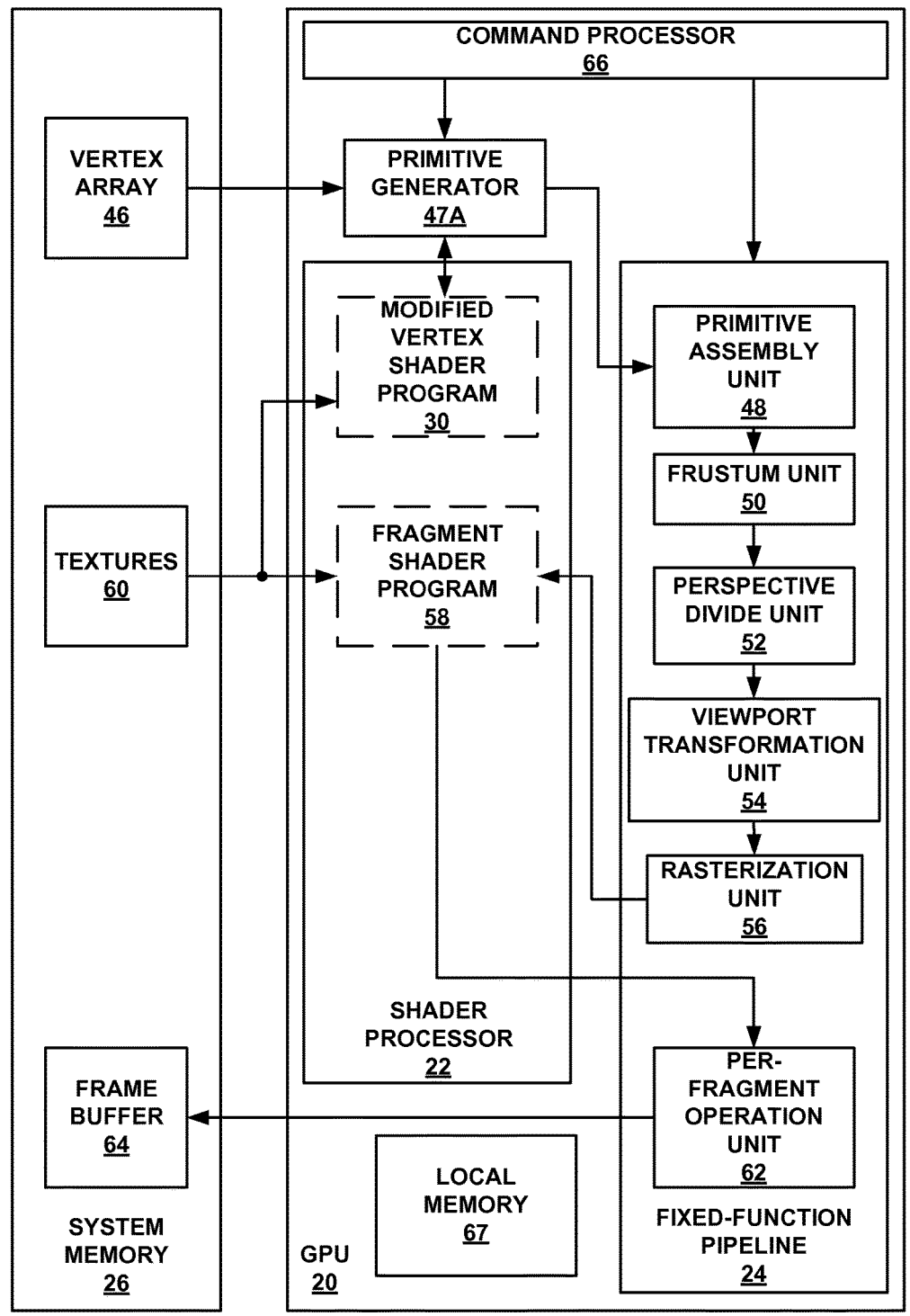
FIG. 3A is a block diagram illustrating an example of a graphics processing unit (GPU) that may implement one or more example techniques described in this disclosure.
Figure 3B:
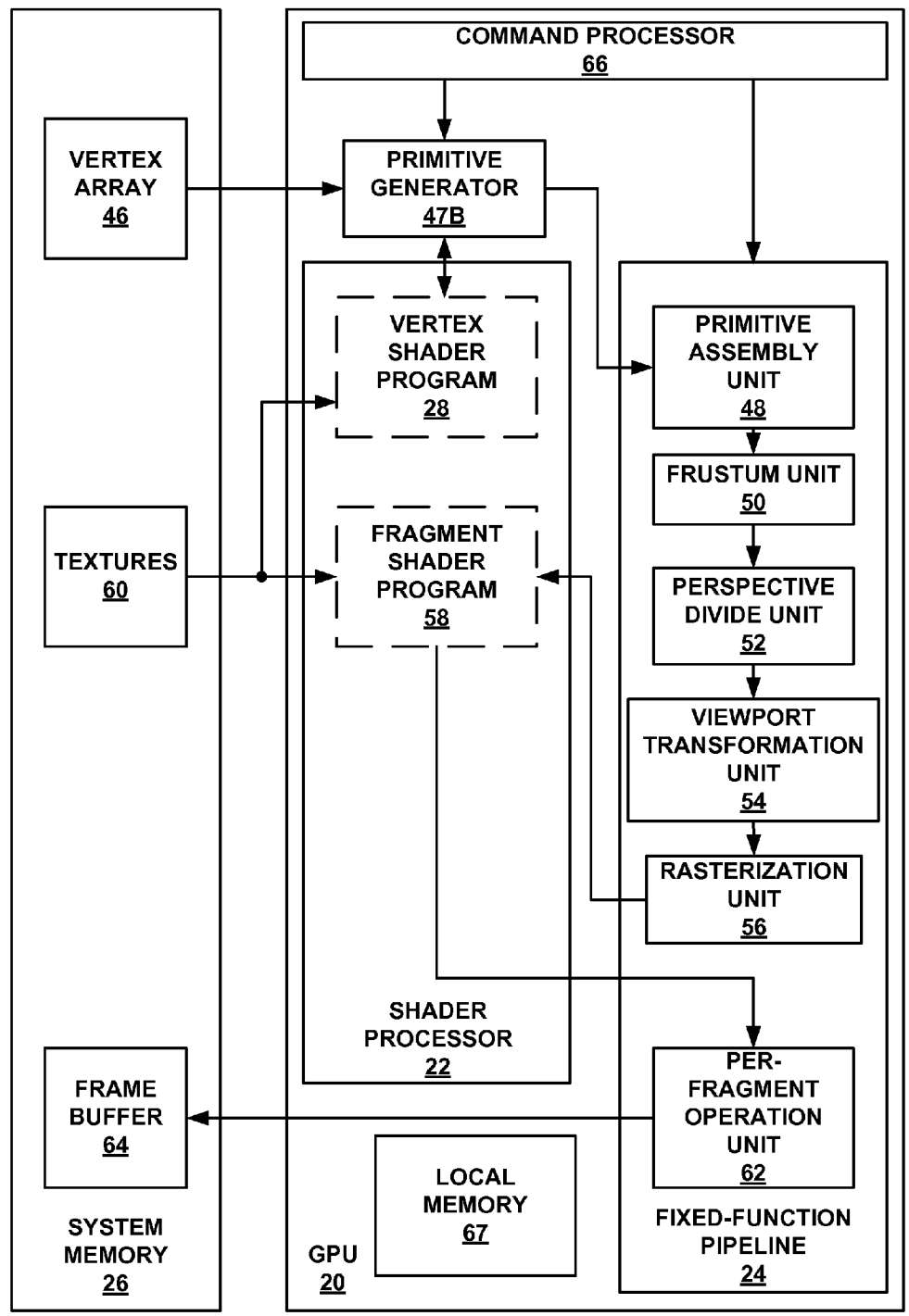
FIG. 3B is a block diagram illustrating another example of a GPU that may implement one or more example techniques described in this disclosure.

FIG. 3A is a block diagram illustrating an example of a graphics processing unit (GPU) that may implement one or more example techniques described in this disclosure. FIG. 3B is a block diagram illustrating another example of a GPU that may implement one or more example techniques described in this disclosure. For instance, the example illustrated in FIG. 3A may be for the case where GPU 20 implements the first mode of operation (e.g., combined attribute information), and the example illustrated in FIG. 3B may be for the case where GPU 20 implements the second mode of operation (e.g., separate attribute information).

For ease of description, FIGS. 3A and 3B are described together. One difference between FIGS. 3A and 3B is that FIG. 3A illustrates primitive generator 47A that outputs information to and receives information from modified vertex shader program 30, whereas FIG. 3B illustrates primitive generator 47B that outputs information to and receives information from vertex shader program 28. Primitive generator 47A and modified vertex shader program 30 may together implement the first mode of operation, and primitive generator 47B and vertex shader program 28 may together implement the second mode of operation. Primitive generator 47A and 47B may be referred to as PC.

It should be understood that primitive generator 47A and primitive generator 47B need not necessarily be two different primitive generators. Rather, GPU 20 may include one primitive generator (e.g., primitive generator 47) that is configured to selectively implement the functionality of primitive generator 47A or the functionality of primitive generator 47B based on various criteria such as number of views, complexity of vertex shader program 28, and whether the only difference in vertices of different views is the coordinate values, as a few examples. In some examples, GPU 20 may include two different primitive generators (e.g., separately include primitive generator 47A and primitive generator 47B), and which of the two primitive generators is activated may be based on the various criteria based on various criteria such as number of views, complexity of vertex shader program 28, and whether the only difference in vertices of different views is the coordinate values, as a few examples.

However, in some examples, GPU 20 may be configured to implement the first mode of operation and not the second mode of operation, and for this example, GPU 20 may include primitive generator 47A and may not necessarily, although possible, include functionality of primitive generator 47B, and vice-versa. For ease, the following describes GPU 20 as being configured to implement the functionality of both primitive generator 47A and primitive generator 47B.

In FIGS. 3A and 3B, application 32, executing on application processor 12, may generate the attribute information for vertices of primitives in a first view (e.g., base view), and primitive generator 47A and 47B, respectively, determine the attribute information for the vertices of primitives in the other views. In some examples, graphics driver 14 or graphics driver wrapper 16 (or possibly application 32 itself), executing on application processor 12, may generate commands to assist primitive generator 47A and 47B to determine the attribute information. For ease, the example is described with graphics driver 14 generating such commands. For example, graphics driver 14 may generate the following command: FramebufferTextureMultiviewOVR(enum target, enum attachment, unit texture, int level, int baseViewIndex, sizei numViews).

In the above command, numViews defines the number of views of the stereoscopic views. The baseViewIndex may be the identification for the first view (e.g., 0). With this command, application processor 12 may attach a 2D array texture to frame buffer 64 so that frame buffer 64 is configured to store sufficient information for the different views. With this command, application processor 12 may also enable multiple views (e.g., numViews are enabled), and allow primitive generator 47A or 47B to replicate primitives to multiple renderTarget slices (e.g., [baseViewIndex, basViewIndex+numViews−1]).

As illustrated in FIGS. 3A and 3B, GPU 20 includes command processor 66, shader processor 22, fixed-function pipeline 24, and local memory 67. Command processor 66 may function as the interface between GPU 20 and application processor 12. For instance, command processor 66 may receive commands from application processor 12, and may determine whether the commands should be forwarded to shader processor 22 or fixed-function pipeline 24.

As one example, as described above, application processor 12, executing application 32, may instruct GPU 20 to execute the object code of modified vertex shader program 30. In this example, command processor 66 may receive the command from application processor 12, and may instruct shader processor 22 to execute the object code of modified vertex shader program 30.

Local memory 67 is the local memory (e.g., on-chip memory) of GPU 20 that various components of GPU 20 use to temporarily store graphics data. Accessing local memory 67 may require less power and bandwidth than accessing external memory such as system memory 26. For example, accessing system memory 26 may require communicating over an external bus, which requires more power than communicating with local memory 67, as well as scheduling time to access system memory 26, which may be result in requiring more time to access system memory 26 as compared to local memory 67. Examples of local memory 67 include cache memory, registers, and the like, and generally include memory units that are on-chip with the integrated circuit that includes GPU 20.

As illustrated in dashed boxes in FIG. 3A, shader processor 22 includes modified vertex shader program 30 and fragment shader program 58, and in FIG. 3B, shader processor 22 includes vertex shader program 28 and fragment shader 58. The dashed boxes are to indicate that shader processor 22 may not actually include vertex shader program 28, modified vertex shader program 30, and fragment shader program 58. Rather, shader processor 22 may execute the object code of vertex shader program 28 (in FIG. 3B), modified vertex shader program 30 (in FIG. 3A), and fragment shader program 58 (in both FIGS. 3A and 3B). The object code of vertex shader 28, modified vertex shader program 30, and fragment shader program 58 may be stored in system memory 26.

Fixed-function pipeline 24 may include one or more fixed-function units such as primitive assembly unit 48, frustum unit 50, perspective divide unit 52, viewport transformation unit 54, rasterization unit 56, and per-fragment operation unit 62. Each of these fixed-function units of fixed-function pipeline 24 may be hardware units that are hardwired to perform specific graphics related functions. Although these fixed-function units of fixed-function pipeline 24 are illustrated as separate components, aspects of this disclosure are not so limited. One or more of the fixed-function units of fixed-function pipeline 24 may be combined together into a common fixed-function unit. Also, there may be more fixed-function units of fixed-function pipeline 24 than those illustrated in FIG. 2. The one or more fixed-function units of fixed-function pipeline 24 are illustrated separately to ease understanding.

Moreover, the specific ordering of the fixed-function units of fixed-function pipeline 24 is illustrated for example purposes and should not be considered limiting. For instance, it may be possible to reorder the fixed-function units of fixed-function pipeline 24. As one example, one of the functions of per-fragment operation unit 62 may be to cull pixels that are occluded by overlapping pixels. It may be possible for this function to be performed earlier in fixed-function pipeline 24.

These fixed-function units of fixed-function pipeline 24 may provide very limited functional flexibility, as compared to shader processor 22. For example, shader processor 22 may be specifically designed to execute programmable shader programs such as vertex shader program 28, modified vertex shader program 30, and fragment shader program 58. These shader programs cause shader processor 22 to function in the manner defined by the shader programs. In other words, shader programs may define the functionality of shader processor 22, whereas the functionality of the fixed-function units of fixed-function pipeline 24 is set.

Primitive generator 47A or 47B receive attribute information from vertex array 46. Vertex arrays 46 may be a memory unit of system memory 26 configured to store first attribute information for a vertex of a first primitive of a first view (e.g., generated from the execution of application 32). Primitive generator 47A or 47B may determine second attribute information for a second vertex of a corresponding primitive of a second view and potentially additional views. As one example, primitive generator 47A or 47B may receive attribute information for the vertex of the corresponding primitive of the second view from application processor 12. As another example, primitive generator 47A or 47B may be add or subtract x-coordinate values from the x-coordinate of the vertex of the primitive of the first view. There may other ways for primitive generator 47A or 47B to determine attribute information for the vertex of the corresponding primitives in the other views, and the techniques are not limited to any specific way to determine the attribute information.

In the example illustrated in FIG. 3A, primitive generator 47A may combine the second attribute information for the second vertex of the corresponding primitive of the second view with the first attribute information for the first vertex of the primitive of the first view to generate a combined attribute information. For instance, the attribute information for the vertex of the primitive of the first view may include N number of values. However, application processor 12 or command processor 66 may reserve storage space in local memory 67 for M number of values for the vertex of the primitive of the first view. In this case, primitive generator 47A may store attribute information for the vertex of the primitive of the second view in the additional storage space (e.g., the additional space being M−N).

If the only difference in the attribute information between the vertex of the primitive of the first view and the vertex of the primitive in the second view is the coordinate, then primitive generator 47A may only need to store the coordinate for the vertex of the primitive of the second view because all other attribute information is the same. For example, primitive generator 47A may store the x-coordinate of the vertex of the primitive of the second view in the additional space since the remaining attribute information between the two vertices is the same.

Functionally, the combined attribute information is associated with the primitive of the first view, but during processing the attribute information may be utilized to generate graphics content for the views of the stereoscopic view. For example, modified vertex shader program 30, executing on shader processor 22 (e.g., shader core 22), may process the combined attribute information to generate graphics data for a stereoscopic view. In this example, a single instance of modified vertex shader program 30 may execute to process the combined attribute information.

Generally, one instance of a vertex shader program, such as vertex shader program 28, executes for each vertex. Therefore, if there are multiple vertices, multiple instances of vertex shader program 28 execute. However, in the example where primitive generator 47A combines the attribute information of two different vertices from two different views, the combined attribute information is functionally the attribute information for a single vertex, although it includes attribute information for multiple vertices, and execution of only one instance of modified vertex shader program 30 is needed to process the combined attribute information.

In some examples, rather than combining the attribute information, the attribute information is kept separate. For example, in FIG. 3B, primitive generator 47B may keep these attribute information separate. In such examples, vertex shader program 28, executing on shader processor 22 (e.g., shader core 22), may process the vertex of the primitive of the first view to generate a first set of graphics data for a stereoscopic view, and process the vertex of the corresponding primitive of the second view to generate a second set of graphics data for the stereoscopic view. In this example, multiple instances of vertex shader program 28 may process the first and second sets of graphics data, respectively.

One of the functions of modified vertex shader program 30 and vertex shader program 28 is to convert world coordinates to eye coordinates. To perform such functionality, modified vertex shader program 30 and vertex shader program 28 may include commands for input layout qualifier (e.g., num_views) and build-in shader input (e.g., gl_ViewID_OVR). As one example, modified vertex shader program 30 or vertex shader program 28 may include the following commands:

```
Matrix WorldToEyeClipMatrix[2]; //view matrix for each eyes (in this
                                  example 2 is num_views)
                uint eyeIndex = gl_ViewID_OVR;
        vector4 clipPos = worldPos * WorldToEyeClipMatrix[eyeIndex];
```

In some cases, the above pseudo-code for WorldToEyeClipMatrix[2] may be modified as follows:

```
Matrix WorldToEyeClipMatrix[2]; //view matrix for each eyes (in this
                                  example 2 is num_views)
               //uint eyeIndex = gl_ViewID_OVR;
        vector4 gl_Position[0] = worldPos * WorldToEyeClipMatrix[0];
        vector4 gl_Position[1] = worldPos * WorldToEyeClipMatrix[1];
```

Although not specifically illustrated, primitive generator 47A or 47B may be a fixed-function unit that is part of fixed-function pipeline 24. However, in some examples, primitive generator 47A or 47B may be software executing on shader processor 22.

Moreover, in some examples, primitive generator 47A or 47B may include a front-end and a back-end (e.g., PC-frontend and PC-backend). For example, as illustrated in FIG. 3A, primitive generator 47A outputs information to modified vertex shader program 30, and receives information back from modified vertex shader program 30. Similarly, as illustrated in FIG. 3B, primitive generator 47B outputs information to vertex shader program 28, and receives information back from vertex shader program 28. The front-end of primitive generator 47A or 47B may be configured to output information to modified vertex shader program 30 or vertex shader program 28, respectively, and back-end of primitive generator 47A or 47B may be configured to receive information from modified vertex shader program 30 or vertex shader program 28, respectively.

The front-end of primitive generator 47A or 47B (e.g., PC-frontend) may be configured generate the attribute information for the vertices of the primitives in the different views and combine the attribute information (for primitive generator 47A) or keep it separate (for primitive generator 47B). Modified vertex shader program 30, as illustrated in FIG. 3A, or vertex shader program 28, as illustrated in FIG. 3B, may process the output from primitive generator 47A or 47B, respectively. Modified vertex shader program 30 or vertex shader program 28 may output the resulting graphics data to primitive generator 47A or 47B, respectively, and the back-end of primitive generator 47A or 47B (e.g., PC-backend) may perform further processing before outputting to fixed-function pipeline 24.

A front-end and a back-end of primitive generator 47A or 47B are described for purposes of illustration only. The front-end and back-end of primitive generator 47A and 47B may be separate units or combined together. In some examples, primitive generator 47A may output to modified vertex shader program 30, and in some examples, primitive generator 47B may output to vertex shader program 28, and modified vertex shader program 30 or vertex shader program 28 may output to fixed-function pipeline 24.

For instance, in the example illustrated in FIG. 3A, although modified vertex shader program 30 may process the combined attribute information for multiple vertices from different views as being the attribute information for one view, after such processing, the back-end of primitive generator 47A may split the resulting data as vertex attribute information for different vertices of different primitives and include identification value to indicate which vertex is associated with which view. These different primitives are then further processed by fixed-function pipeline 24 as two different primitives of different views so that the resulting data is graphics data for different views. Similarly, in FIG. 3B, the back-end of primitive generator 47B may include information identifying which vertex is associated with which view.

As illustrated in FIGS. 3A and 3B, primitive generator 47A and 47B may receive vertex array 46 and textures 60 as inputs. Vertex arrays 46 may include information to generate the pixel values (i.e., attribute information) for the vertices generated by application 32 (e.g., the coordinates of the vertices, color values of the vertices, and transparency values of the vertices), as described above. For example, the coordinates of the vertices of vertex array 46 may be the world coordinates as defined by application 32. Textures 60 may be pixel values for textures that overlay over the generated graphics to provide a more realistic view of the graphics content.

After modified vertex shader program 30 or vertex shader program 28 performs respective functions (e.g., the model view transformation) to generate clipping coordinates, modified vertex shader program 30 or vertex shader program 28 provides the clipping coordinates for the vertices to primitive assembly unit 48 of fixed-function pipeline 24. At this juncture, the remaining units of fixed-function pipeline 24 may process each of the primitives of the different views as separate primitives, but may be able to leverage some of the processing performed for one primitive for processing another corresponding primitive in a different view.

In some examples, the generation of modified vertex shader program 30 may not be necessary in all examples. For instance, in some examples, it may be possible that a vertex shader program is initially designed to handle combined attribute information in the manner that primitive generator 47A combines the attribute information. For these examples, system memory 26 may already store the source code (or possibly object code) of such vertex shader programs. Therefore, the description of the techniques being performed by modified vertex shader program 30 is provided for illustration purposes only. In some examples, system memory 26 may already store a vertex shader program that performs the same functions, without needing any modification, as those of modified vertex shader program 30. The techniques described in this disclosure are applicable to examples where no modification is needed, but are described with respect to modified vertex shader program 30.

Also, it may not be necessary for there to be two different vertex shader programs in every example. In some examples, there may be a single vertex shader program that includes functionality of both vertex shader program 28 and modified vertex shader program 30. In such examples, during execution of this single vertex shader program, GPU 20 may dynamically select the functionality corresponding to vertex shader program 28 or the functionality corresponding to modified vertex shader program 30. For purposes of illustration, the examples are illustrated with two vertex shader programs: vertex shader program 28 and modified vertex shader program 30.

Primitive assembly unit 48 may utilize the clipping coordinates for the vertices to assemble the vertices into primitives. For example, primitive assembly unit 48 may assemble a plurality of triangles based on the clipping coordinates for the vertices, where the vertices of each of the triangles correspond to vertices received from modified vertex shader program 30 or vertex shader program 28. The plurality of triangles is one example of primitives. In general, primitive assembly unit 48 may assemble the received vertices into any polygon based on the clipping coordinates for the received vertices.

Primitive assembly unit 48 may transmit the assembled primitives to frustum unit 50. Frustum unit 50 may determine whether the assembled primitives are within a view volume. Frustum unit 50 may determine whether a primitive is fully within the view volume, fully external to the view volume, or partially within the view volume and partially external to the view volume. Frustum unit 50 may cull, from further processing, primitives that are fully external to the view volume and portions of primitives are that external to the view volume. Frustum unit 50 may keep, for further processing, primitives that are fully within the view volume and portions of primitives that are within the view volume.

Frustum unit 50 may transmit the remaining primitives and portions of primitives to perspective divide unit 52. Perspective divide unit 52 may expand or shrink primitives based on their depth. For example, each of the primitives may be defined by x, y, and z coordinates. The z coordinate may indicate how close or away the primitive is. It should be noted that at this stage, GPU 20 is generating graphics content for one of the images for the stereoscopic view. Therefore, the concept of proximity of a primitive is in the context of a mono view, not a stereoscopic view.

Perspective divide unit 52 may transmit the primitives to viewport transformation unit 54. Viewport transformation unit 54 modifies the size and location of the image to fit the defined viewport. For example, prior to viewport transformation unit 54, modified vertex shader program 30 and the fixed-function units of fixed-function pipeline 24 process graphics data as if the image is to be displayed on the entirety of the display. The function of viewport transformation unit 54 may be to modify the size and location of the image so that the image is constrained to the defined viewport.

Viewport transformation unit 54 may forward the primitives to rasterization unit 56. Rasterization unit 56 may convert the primitives into pixels of the display. For example, rasterization unit 56 may determine which pixels of the display are encompassed by each of the primitives. Rasterization unit 56 may also determine the location of each of these pixels on the displays.

Rasterization unit 56 may output its graphics data to fragment shader program 58. Fragment shader program 58, sometimes referred to as a pixel shader, may be a shader program that executes on shader processor 22. For example, the source code for fragment shader program 58 may be stored in system memory 26, and compiler 18 may compile the source code of fragment shader program 58 to generate the object code of fragment shader program 58. Alternatively, system memory 26 may store the object code for fragment shader program 58 without it necessarily being generated by compiler 18.

Fragment shader program 58 may output the color values for each of the pixels on the display. For example, fragment shader program 58 may define the color of each pixel based on a red-green-blue (RGB) component. Fragment shader program 58 may utilize 8-bits to define the red component, 8-bits to define the green component, and 8-bits to define the blue component, as one illustrative example. Fragment shader program 58 may output the color values to per-fragment operation unit 62.

Per-fragment operation unit 62 may cull pixels that are not viewable. For example, a pixel of a further away object may be overlapped by a pixel of a closer object, which per-fragment operation unit 62 may determine from a z-buffer. The overlapping may cause the pixel of the further away object to be fully occluded. In this case, per-fragment operation unit 62 may cull the overlapped pixel. Per-fragment operation unit 62 may also blend pixels together. For example, an overlapping pixel may be translucent so that it does not fully occlude the overlapped pixel. In this case, per-fragment operation unit 62 may blend the color of these pixels together.

The output of per-fragment operation unit 62 may be pixel values (e.g., color) for the pixels on the display. Per-fragment operation unit 62 may output the pixel values to frame buffer 64, of system memory 26, for temporary storage. Frame buffer 64 may store the pixel values for each of the pixels on the display. When the output of frame buffer 64 is displayed, the viewer perceives 3D viewing experience. In other words, frame buffer 64 stores the graphics data for the stereoscopic view.

Figure 4:
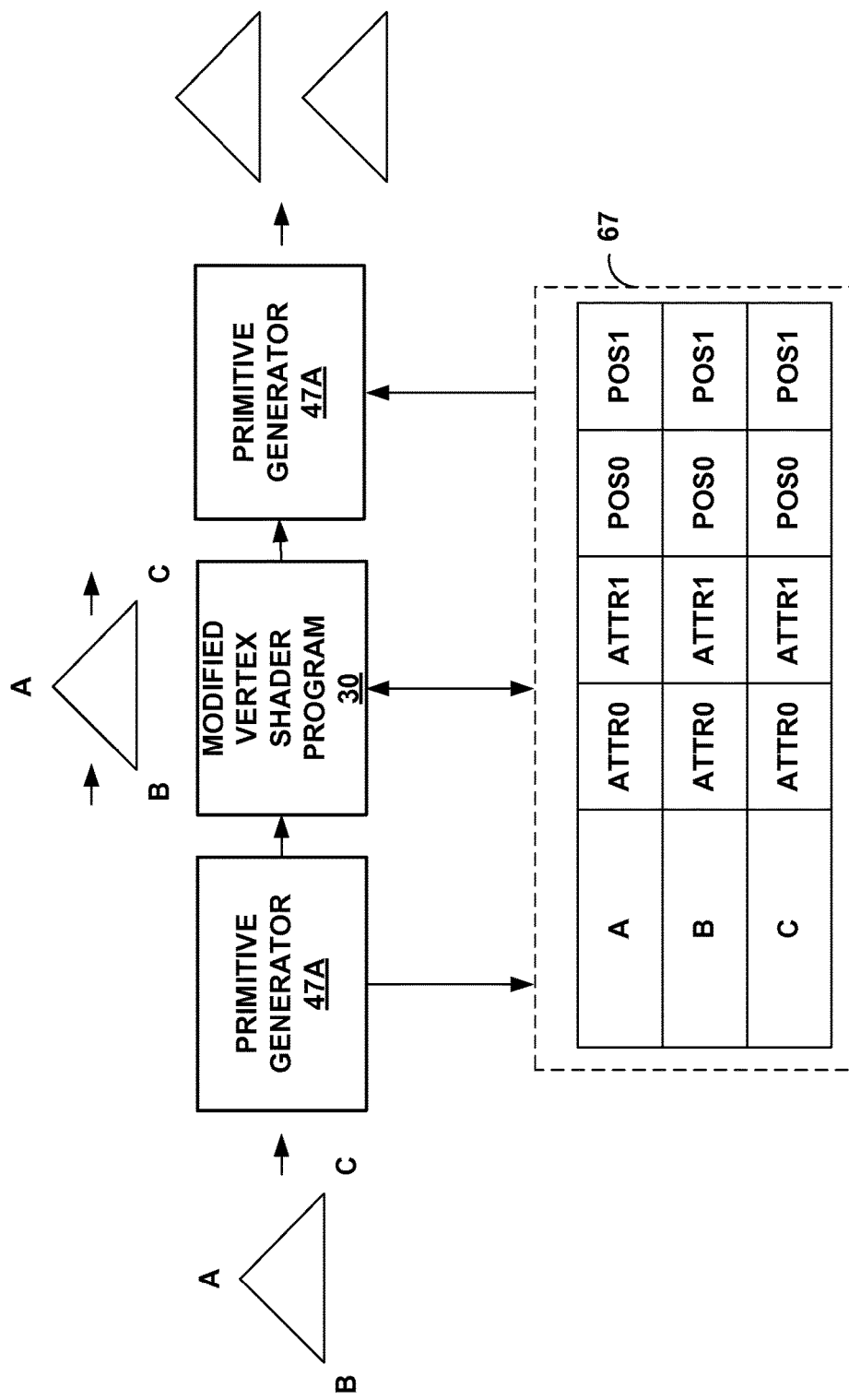
FIG. 4 is a flowchart illustrating an example technique of generating stereoscopic view.

FIG. 4 is a flowchart illustrating an example technique of generating stereoscopic view. As illustrated in FIG. 4, front-end of primitive generator 47A receives vertices A, B, and C for a primitive of a first view. In this example, the front-end of primitive generator 47A may determine attribute information for a primitive of a second view and store this information as combined attribute information in local memory 67. For instance, for vertex A, primitive generator 47A may store attribute information ATTR0 and ATTR1, which may be the same attribute information for the vertex A of the primitive in the first view and for the corresponding vertices of corresponding primitives in the other views. For vertex A, primitive generator 47A may store POS0, which is the position information for vertex A, and POS1, which is the position information for the corresponding vertex in the corresponding primitive of the other view. The same is true for vertex B and C.

Modified vertex shader program 30 may retrieve the combined attribute information from local memory 67 and process the combined attribute information to generate new attribute information (e.g., graphics data) for the vertices. At this juncture, the primitive formed from vertices A, B, and C is still processed as a single primitive, even though the combined attribute information includes attribute information for different vertices (e.g., one for primitive of first view, and another for primitive of second view).

After processing, modified vertex shader program 30 outputs the graphics data (e.g., newly generated attribute information) to the back-end of primitive generator 47A. The back-end of primitive generator 47A may generate corresponding primitives for different views, and the graphics processing proceeds with separate primitives (e.g., two or more primitives for each of the views).

Figure 5:
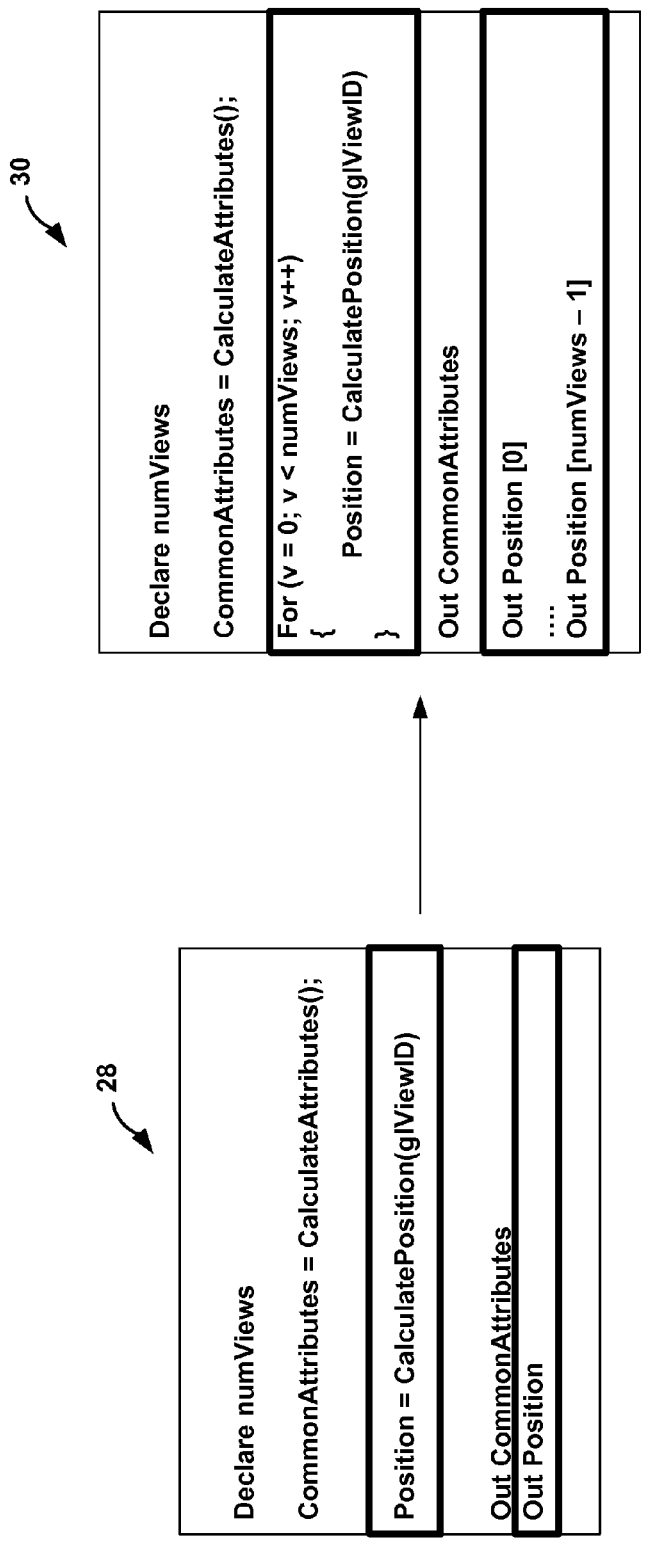
FIG. 5 is text illustrating an example of adding instructions in a vertex shader.

FIG. 5 is text illustrating an example of adding instructions in a vertex shader. As described above, in some examples, compiler 18, graphics driver 14, and/or graphics driver wrapper 16 may be configured to add instructions into vertex shader program 28 to generate modified vertex shader program 30, where modified vertex shader program 30 is configured to process the combined attribute information. For ease, the example of FIG. 5 is described with respect to compiler 18 performing such functions, but may be performed by other modules individually or in combination with compiler 18.

Compiler 18 retrieves the source code for vertex shader program 28 from system memory 26. As illustrated by the thick boxes, compiler 18 may add source code to the source code of vertex shader program 28 to include source code for generating position information for a plurality of views (e.g., numViews) and outputting the position information. The result is the source code for modified vertex shader program 30 that is configured to process combined attribute information.

In the example illustrated in FIG. 5, compiler 18 adds source code to generate position information for the plurality of views, but source code to determine other attribute information for the vertices of primitives in the other views is not illustrated. In some examples, compiler 18 may add similar source code to determine other attribute information for the vertices of primitives in other views.

However, in some examples, compiler 18 may only add source code to generate position information for the plurality of views. As described above, if the position information is the only difference between vertices of corresponding primitives in different views, then modified vertex shader program 30 is utilized. Therefore, only source code to generate position information, and no other attribute information, for the plurality of views may be needed. Again, it should be understood that this is one example, and source code to determine more attribute information for the vertices in different views may be possible.

Figure 6:
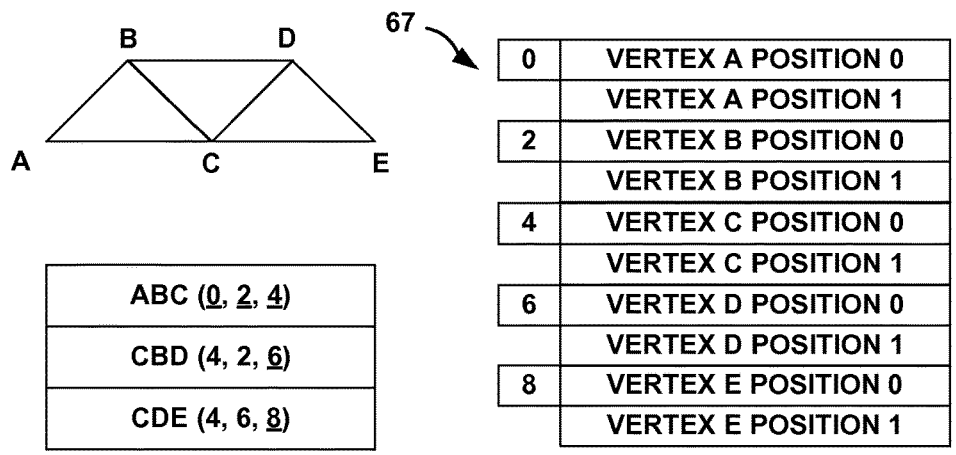
FIG. 6 is a conceptual diagram illustrating one example of information generated by a primitive generator that is outputted to a vertex shader.

FIG. 6 is a conceptual diagram illustrating one example of information generated by a primitive generator that is outputted to a vertex shader. For instance, FIG. 6 illustrates the information that the front-end of primitive generator 47A outputs to modified vertex shader 30. FIG. 6 illustrates a triangle strip of three triangles (e.g., primitives). The first triangle includes vertices A, B, C, the second triangle includes vertices B, C, D, and the third triangle includes vertices C, D, E. Assuming two views, for each of these vertices there is attribute information for two views (e.g., position information for vertex A in a first view and position information for vertex A in a second view). In FIG. 6, attribute information for two positions of the vertices is illustrated as vertex A position 0 (for location is view 0), vertex A position 1 (for location in view 1), vertex B position 0, vertex B position 1, and so forth. Also, in FIG. 6, index 0 to local memory 67 includes the combined attribute information for all corresponding vertices A in the different views, index 2 to local memory 67 includes the combined attribute information for all corresponding vertices B in the different view, and so forth.

Primitive generator 47A may output index 0, index 2, and index 4 to modified vertex shader program 30, corresponding to vertices A, B, and C. Modified vertex shader program 30 may retrieve the corresponding attribute information for the plurality of vertices in the different view (e.g., for all vertices A in the different views, all vertices B in the different views, and all vertices C in the different views), as illustrated by the underlines in ABC (<u>0</u>, <u>2</u>, <u>4</u>).

Because triangle CBD shares vertices B and C with triangle ABC, primitive generator 47A may then output index 6 to modified vertex shader program 30, corresponding to vertex D, and modified vertex shader program 30 may process the combined attributed information for the plurality of vertices in the different view (e.g., for all vertices D in the different views), as illustrated by the underline of only 6 in CBD (4, 2, <u>6</u>). Vertices B and C have already been processed, and therefore do not need to be processed again.

Because triangle CDE shares vertices C and D with triangle CBD, primitive generator 47A may then output index 8 to modified vertex shader program 30, corresponding to vertex E, and modified vertex shader program 30 may process the combined attributed information for the plurality of vertices in the different view (e.g., for all vertices E in the different views), as illustrated by the underline of only 8 in CDE (4, 6, 8). Vertices C and D have already been processed, and therefore do not need to be processed again.

In the above example, vertices A, B, C, D, or E in the different views refers to cases of the vertex A, B, C, D, or E in the different views. For instance, the triangle strip illustrated in FIG. 6 may exist in all views, but be slightly displaced in each view relative to the other views. In this example, for the first view, there is a triangle ABC, and for the second view, there is also a triangle ABC. There may be horizontal displacement between triangle ABC of the first view and triangle ABC of the second view. In the example illustrated in FIG. 6, modified vertex shader program 30 may be configured to process the vertex A of the triangle ABC in the first view and vertex A of the triangle ABC in the second view. This is because primitive generator 47A combined the attribute information for vertex A of the triangle ABC in the first view and the attribute information for vertex A of the triangle ABC in the second view. The same holds true for the other vertices as well.

In some cases, multiple instances of modified vertex shader program 30 may execute to process multiple vertices of a primitive in parallel (e.g., at the same time). For example, three instances of modified vertex shader program 30 may execute to process vertices A, B, and C in parallel. However, in this case, a single instance of modified vertex shader program 30 is capable of processing all corresponding vertices A in the different views, a single instance of modified vertex shader program 30 is capable of processing all corresponding vertices B in the different views, and a single instance of modified vertex shader program 30 is capable of processing all corresponding vertices C in the different views.

Figure 7:
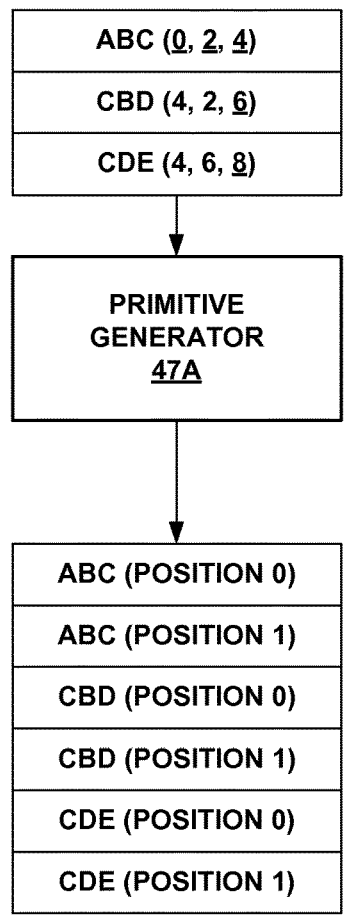
FIG. 7 is a conceptual diagram illustrating one example of information generated by a primitive generator.

FIG. 7 is a conceptual diagram illustrating one example of information generated by a primitive generator. FIG. 7 illustrates the output from modified vertex shader program 30 that is fed back to the back-end of primitive generator 47A for further processing. In this example, modified vertex shader program 30 may be processed the combined attribute information for each of the vertices of the different views as a single vertex. The back-end of primitive generator 47A may split up the vertices of the different views, and generate separate primitives (one for each of the views). For example, if in the example of FIG. 6 there are two views, then in the example of FIG. 7, there will be two triangles ABC, two triangles BCD, and two triangles CDE that primitive generator 47A outputs.

For example, primitive generator 47A outputs triangle ABC for position 0, which is the position of triangle ABC in view 0, triangle ABC for position 1, which is the position of triangle ABC in view 1, triangle CBD for position 0, which is the position of triangle CBD in view 0, triangle CBD for position 1, which is the position of triangle CBD in view 1, and so forth. In addition, primitive generator 47A may assign an identification value to the outputted primitives indicating to which view the primitives belong. For instance, primitive generator 47A may generate the renderTargetArrayIndex from baseViewIndex to baseViewIndex+numViews−1, where the renderTargetArrayIndex is the identification value that identifies to which view a primitive belongs, and the value of renderTargetArrayIndex ranges from 0 (e.g., baseViewIndex) to the total number of views minus one (e.g., numViews−1).

Primitive generator 47A may output the generated primitives through fixed-function pipeline 24 for rasterization. In addition, primitive generator 47A may output the primitive to a cache, such as vertex parameter cache (VPC) on local memory 67 with correct slotID of vertex parameter cache of all vertices of this primitive. The ABC, CBD, and CDE are primitives that may be sent to the VPC. As an example, the slotID for primitive having vertices ABC is (0, 6, 12), where slotID 0 is for vertex A, slotID 6 is for vertex B, and slotID 12 is for vertex C. It should be understood that slotID 0 for vertex A stores the attribute information for vertex A in view 0 and vertex A in view 1. In this way, one slot is needed to store attribute information for two different vertices (e.g., one for the vertex in view 0 and the other for the vertex in view 1).

In this example, the slotID for primitive having vertices CBD is (12, 6, 18), where slotID 18 is for vertex D, and the slotID for primitive having vertices CDE is (12, 18, 24). Other slot identifiers are possible, and these values are provided merely for purposes of illustration.

Figure 8:
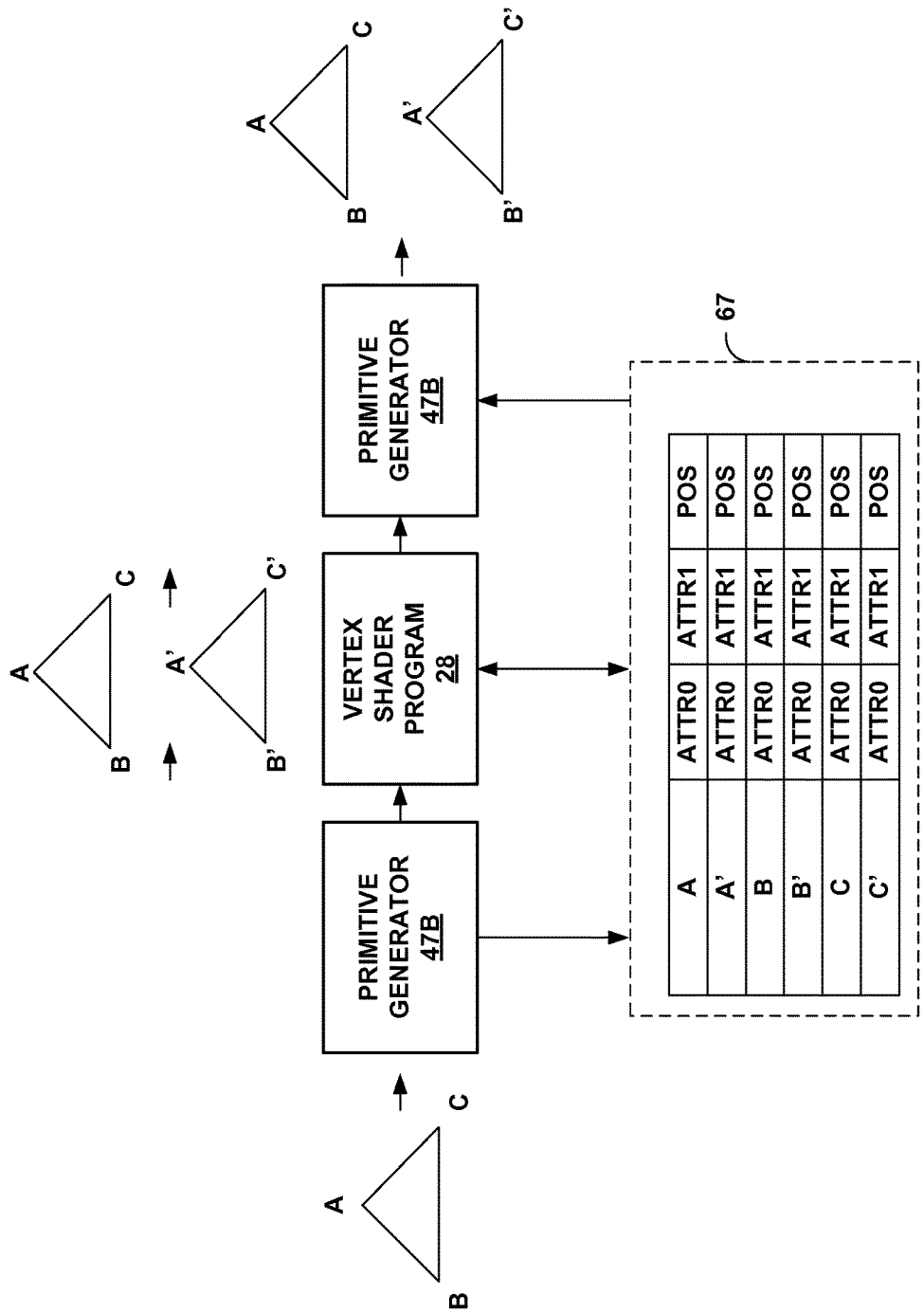
FIG. 8 is a flowchart illustrating another example technique of generating stereoscopic view.

FIG. 8 is a flowchart illustrating another example technique of generating stereoscopic view. The example of FIG. 8 is described with the functionality of primitive generator 47B which does not combine attribute information, and instead generates separate attribute information for each of the corresponding vertices in the different views. Also, in the example of FIG. 8, assume that there are two views, but the techniques are applicable to cases with multiple views as well.

In this example, primitive generator 47B receives a primitive including vertices A, B, and C. Primitive generator 47B may store attribute information for each of vertices in local memory 67. Additionally, primitive generator 47B may determine attribute information for the vertices in the different views, and may also store the attribute information for each of these vertices in local memory 67. In this example, primitive generator 47B may not combine the attribute information.

For example, as illustrated in FIG. 7, local memory 67 stores the attribute information for vertices A, B, and C. In addition, local memory 67 stores the attribute information for vertices A', B', and C'. Vertices A', B', and C' may respectively correspond to vertices A, B, and C, but are in a view other than the view that includes vertices A, B, and C.

Vertex shader program 28 may process the attribute information for each of the vertices. For instance, rather than one instance of modified vertex shader program 30 executing to process both vertex A and vertex A', in the example of FIG. 8, two instances of vertex shader program 28 may execute: one to process vertex A and another to process vertex A'. The same applies to vertices B, B' and C, C'.

The back-end of primitive generator 47B may receive the output graphics data of vertex shader program 28 (e.g., the newly generated attribute information by the execution of vertex shader program 28). The back-end of primitive generator 47B may assign the identification value to each of the primitives (e.g., renderTargetArrayIndex), and output the primitives to fixed-function pipeline 24 for further processing.

Figure 9:
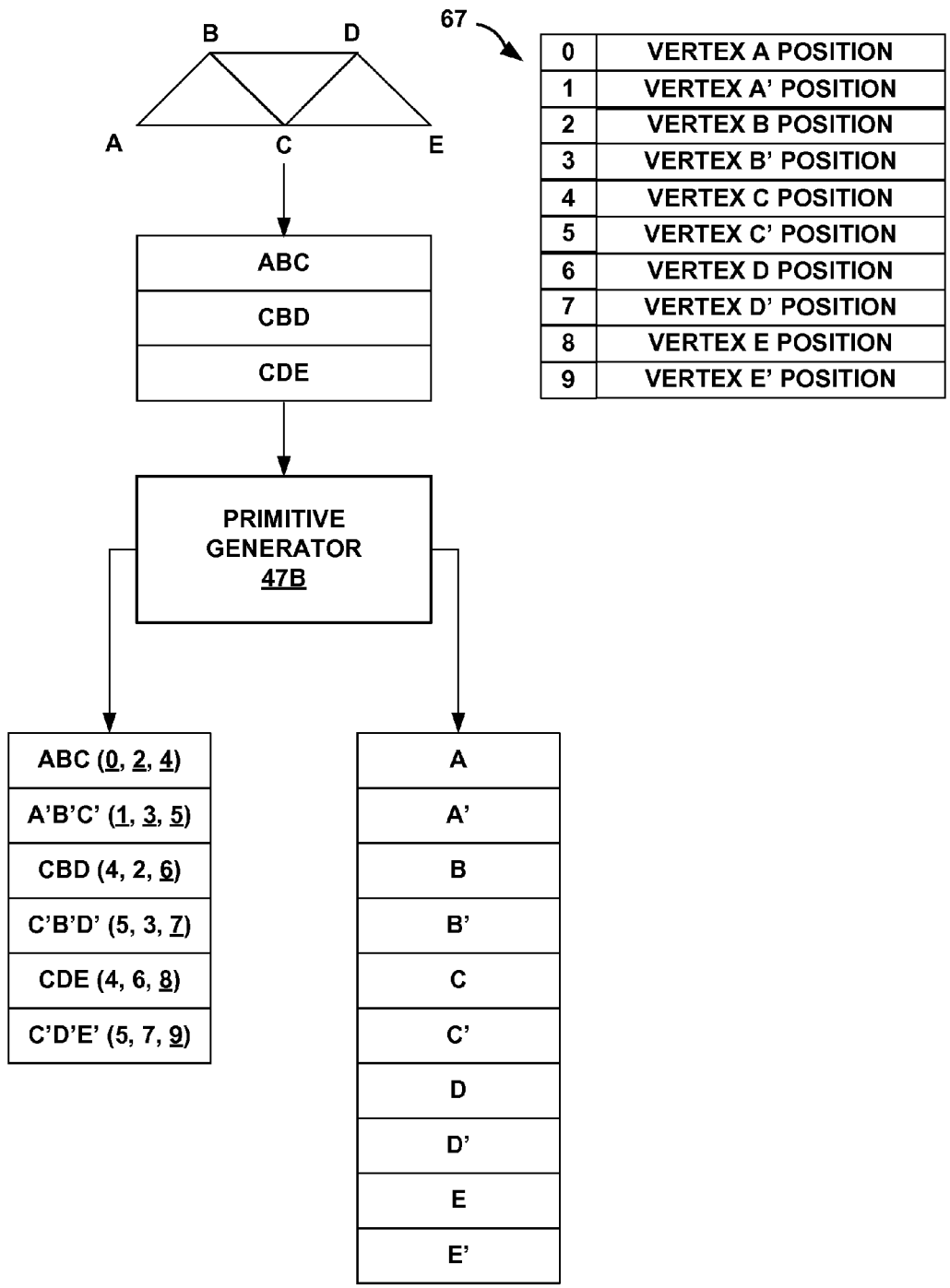
FIG. 9 is a conceptual diagram illustrating another example of information generated by a primitive generator that is outputted to a vertex shader.

FIG. 9 is a conceptual diagram illustrating another example of information generated by a primitive generator that is outputted to a vertex shader. As illustrated in FIG. 9, for a similar triangle strip as illustrated in FIG. 6, primitive generator 47B may store in local memory 67 the attribute information for vertices A-E' in indices 0-9. In this example, because vertices A', B', C', D', and E' are all for primitives in a second view, vertices A, B, C, D, and E are all for primitives in a first view, and the attribute information for corresponding vertices is not combined, primitive generator 47B may separately store the attribute information.

In FIG. 9, the front-end of primitive generator 47B may output the indices for triangle ABC for vertex shader program 28 to process vertices A, B, and C, as illustrated by ABC (0, 2, 4), and output the indices for triangle A'B'C' for vertex shader program 28 to process vertices A', B', and C' as illustrated by A'B'C' (1, 3, 5). Then for triangle CBD, only index 6 may be needed as illustrated by CBD (4, 2, 6) because vertices C and B have already been processed, and for triangle C'B'D', only index 7 may be needed as illustrated by C'B'D' (5, 3, 7) because vertices C' and B' have already been processed, and so forth.

Also, FIG. 9 illustrates that primitive generator 47B outputs a list of A, A', B, B', C, C', and so forth. This is to illustrate that multiple instances of vertex shader program 28 may execute. For example, a first instance of vertex shader program 28 may execute to process vertex A, and a second instance of vertex shader program 28 may execute to process vertex A', and so forth for the other vertices. In the example described with respect to FIG. 7, one instance of modified vertex shader program 30 executed to process both vertex A and corresponding vertex in another view because their attribute information was combined by primitive generator 47A. In FIG. 9, two instances of vertex shader program 28 are needed to process vertex A and its corresponding vertex in another view (A') because their attribute information is kept separate by primitive generator 47B.

Figure 10:
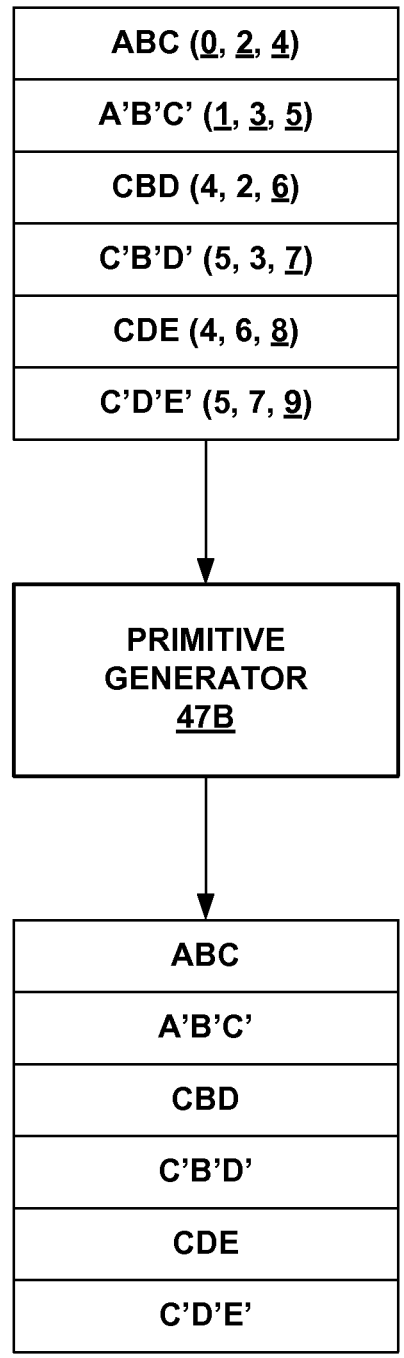
FIG. 10 is a conceptual diagram illustrating another example of information generated by a primitive generator.

FIG. 10 is a conceptual diagram illustrating another example of information generated by a primitive generator. FIG. 10 illustrates the output of vertex shader program 28 that the back-end of primitive generator 47B receives. As illustrated, the back-end of primitive generator 47B outputs the triangles ABC, A'B'C, CBD, C'B'D', CDE, and C'D'E'. In addition, primitive generator 47B may assign the identification value (e.g., renderTargetArrayIndex) to each primitive (e.g., triangle) identifying the view to which the primitive belongs.

Similar to the example of primitive generator 47A in FIG. 7, primitive generator 47B may output the generated primitives through fixed-function pipeline 24 for rasterization. In addition, primitive generator 47B may output the primitive to a cache, such as the VPC on local memory 67 with correct slotID of vertex parameter cache of all vertices of this primitive. Unlike FIG. 7 where the ABC, CBD, and CDE are primitives that may be sent to the VPC, in FIG. 10, the ABC, A'B'C', CBD, C'B'D', CDE, and C'D'E' are primitives that may be sent to the VPC. As an example, the slotID for primitive having vertices ABC is (0, 10, 20), where slotID 0 is for vertex A, slotID 10 is for vertex B, and slotID 20 is for vertex C. In this example, the slotID for primitive having vertices A'B'C' is (5, 15, 25), the slotID for primitive having vertices CBD is (20, 10, 30), the slotID for primitive having vertices C'B'D' is (25, 15, 35), the slotID for primitive having vertices CDE is (20, 30, 40), and the slotID for primitive having vertices C'D'E' is (25, 35, 45).

In this example, the attribute information for the vertices is not combined, and therefore, the attribute information is kept separate and stored separately. For instance, two slot positions are needed, one for storing attribute information for vertex A in view 0 and another for storing attribute information for vertex A' in view 1. Vertex A and vertex A' may correspond to one another, but their attribute information is stored separately, whereas in FIG. 7, the same slot stored attribute information for two different corresponding vertices (e.g., slot 0 stored attribute information for vertex A of view 0 and vertex A of view 1). Other slot identifiers are possible, and these values are provided merely for purposes of illustration.

The above examples described the first mode of operation in which attribute information of vertices of corresponding primitives in different views is combined for vertex shader program processing for stereoscopic view generation, and the second mode of operation in which attribute information of vertices of corresponding primitives in different view is kept separate for vertex shader program processing for stereoscopic view generation. In some examples, GPU 20 may support both the first and second modes of operation, but the techniques described in this disclosure should not be considered limiting.

The first mode of operation may perform better than the second mode of operation, and may therefore be the default mode of operation unless certain criteria are met. As one example, if other attribute values in addition to the position information for vertices are different for corresponding vertices of corresponding primitives, then the second mode of operation may be preferred over the first mode of operation. As another example, if the number of attributes that modified vertex shader program 30 outputs plus the number of views is greater than a threshold (e.g., 32), then the second mode of operation may be preferred over the first mode of operation. As another example, if the number of views is greater than a threshold number of views (e.g., 8), then the second mode of operation may be preferred over the first mode of operation. Also, if modifying vertex shader program 28 is too complicated to generate modified vertex shader program 30, then the second mode of operation may be preferred over the first mode of operation.

While implementing the second mode of operation may generally be less preferable to the first mode of operation (e.g., because more instances of vertex shader program 28 have to execute), there may be certain other advantages. For example, the overhead on graphics driver 14 may be reduced when performing the second mode of operation (e.g., limited submission to command buffer), there may be reduction in vertex fetch, and there may be potential better texture cache hit rate, as a few examples, in addition to being a fallback technique if the first mode of operation is not available.

Figure 11:
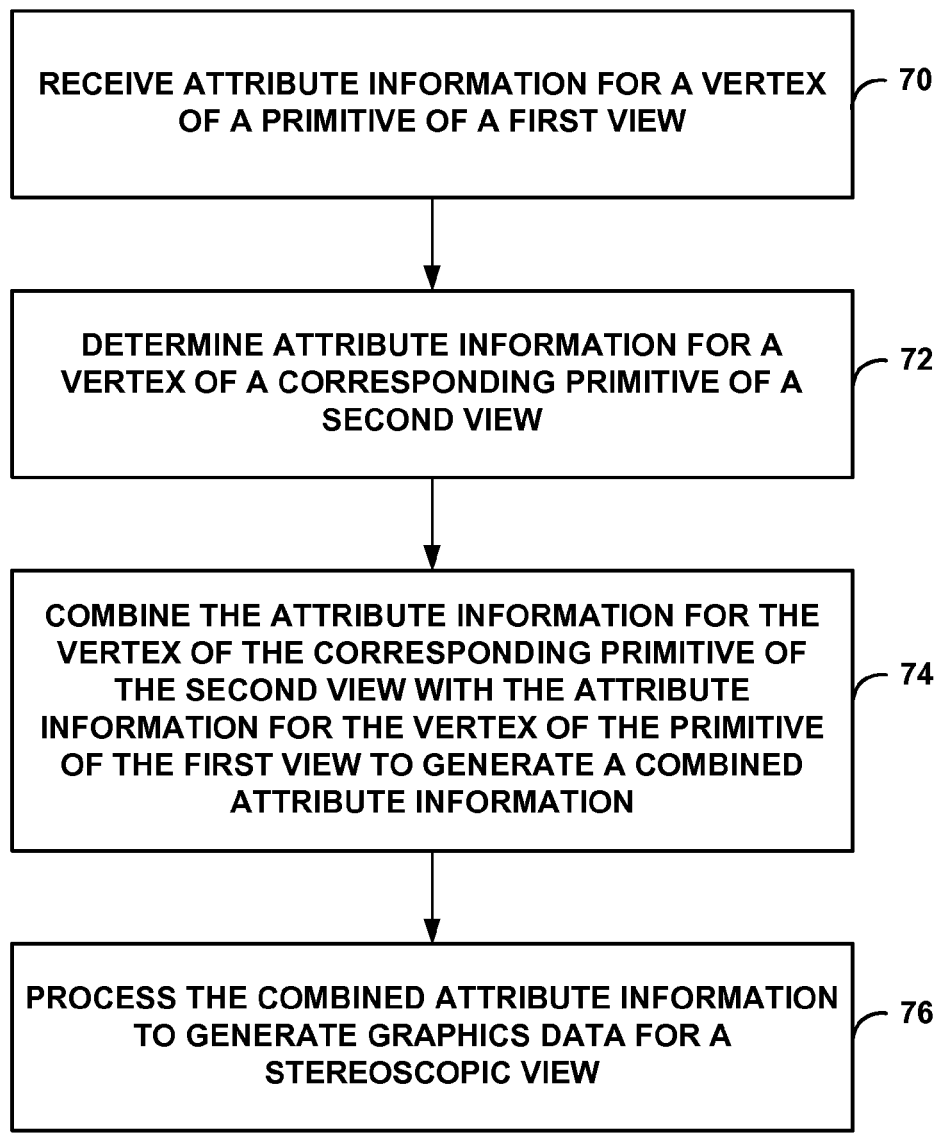
FIG. 11 is a flowchart illustrating an example method of generating stereoscopic view.

FIG. 11 is a flowchart illustrating an example method of generating stereoscopic view. GPU 20 may receive first attribute information for a first vertex of a primitive of a first view (70), and may determine second attribute information for a second vertex of a corresponding primitive of a second view (72). The corresponding primitive is a primitive in the second view that includes content similar to the primitive in the first view, but there is disparity between the primitives in the two views. Also, in some examples, GPU 20 may determine respective attribute information for respective vertices of corresponding primitives of a plurality of views.

GPU 20 may combine the second attribute information for the second vertex of the corresponding primitive of the second view with the first attribute information for the first vertex of the primitive of the first view to generate combined attributed information (74). For example, primitive generator 47A of GPU 20 may combine the attribute information. For instance, primitive generator 47A may combine the position information for the primitive in the second view with the attribute information for the primitive in the first view and store this combined attribute information in local memory 67.

GPU 20 may process the combined attribute information to generate graphics data for a stereoscopic view (76). For example, a vertex shader program (e.g., modified vertex shader program 30) may be configured to process the combined attribute information. Vertex shader programs tend to process the attribute information for only one vertex. In the techniques described in this disclosure, modified vertex shader program is configured to process attribute information that includes attribute information for two different vertices. Most of the attribute information (e.g., all attribute information except position information) may be the same. In some examples, a single execution of modified vertex shader program 30 may process the combined attribute information.

Because vertex shader programs tend to process one vertex per execution instance, to process the attribute information of two different vertices for two different views would need execution of two instances of the vertex shader. However, in the techniques described in this disclosure, because modified vertex shader program 30 is configured to process the combined attribute information (which includes attribute information for two different vertices), only a single instance of modified vertex shader program 30 may need to be executed.

In some examples, system memory 26 may store instructions of a vertex shader program that is designed to process the combined attribute information. However, in some examples, application processor 12 may generate the vertex shader program that can process the combined attribute information. For example, application processor 12, via compiler 18, graphics driver 14, and/or graphics driver wrapper 16, may add instructions in vertex shader program 28 to generate modified vertex shader program 30. In this example, the instructions included in vertex shader program 28 configures modified vertex shader program 30 to process the combined attribute information.

In the examples described above, GPU 20 may perform a first mode of operation, such as that illustrated in FIG. 11, or a second mode of operation based on certain criteria. For example, application processor 12 and/or GPU 20 may determine whether a number of views of the stereoscopic view is less than a threshold, determine whether only a position between the vertex of the primitive of the first view and the vertex of the primitive of the second view is different, or determine whether modifying a vertex shader program requires less time or power consumption over respective thresholds. In this example, primitive generator 47A may combine the attribute information of vertices of primitives in the first view and the second view, and modified vertex shader program 30 may process the combined attribute information in response to the determination that one or more of the number of views of the stereoscopic view is less than the threshold, only the position between the vertex of the primitive of the first view and the vertex of the primitive of the second view is different, or modifying the vertex shader program requires less time or power consumption over respective thresholds.

In these examples, in response to the determination that the number of views of the stereoscopic view is greater than the threshold, determination that not only the position between the vertex of the primitive of the first view and the vertex of the primitive of the second view is different, or determination that modifying the vertex shader program requires more time or power consumption over respective thresholds, GPU 20 may perform the second mode of operation. For example, primitive generator 47B may not combine the attribute information and keep the attribute information of the vertices of the primitives in the first view and second view separate. GPU 20 may execute multiple instances of vertex shader program 28 to process the vertex of the primitive of the first view to generate a first set of graphics data for the stereoscopic view, and to process the vertex of the primitive of the second view to generate a second set of graphics data for the stereoscopic view.

Figure 12:
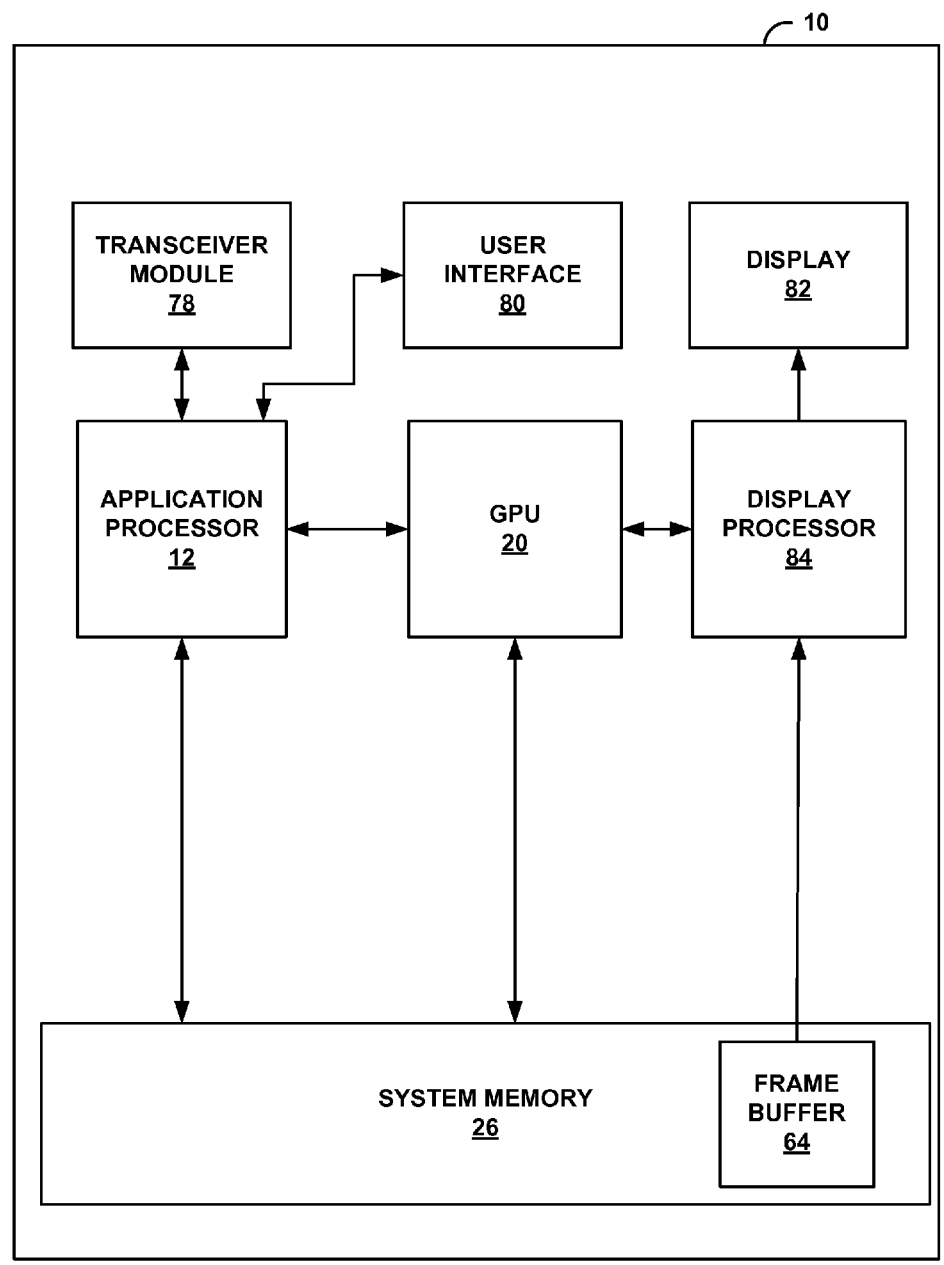
FIG. 12 is a block diagram illustrating the example device of FIG. 1 in further detail.

FIG. 12 is a block diagram illustrating the example device of FIG. 1 in further detail. For example, as indicated above, examples of device 10 include, but are not limited to, mobile wireless telephones, PDAs, video gaming consoles that include video displays, mobile video conferencing units, laptop computers, desktop computers, television set-top boxes, and the like.

As illustrated in FIG. 12, device 10 may include display 82, application processor 12, GPU 20, system memory 26, which includes frame buffer 64, transceiver module 78, user interface 80, and display processor 84. Application processor 12, GPU 20, and system memory 26 may be substantially similar or identical to those illustrated in FIGS. 1, 3A, and 3B. For purposes of brevity, only the components that are shown in FIG. 12, but not shown in FIGS. 1, 3A, and 3B are described in detail.

Device 10, as illustrated in FIG. 12, may include additional modules or units not shown in FIG. 12 for purposes of clarity. For example, device 10 may include a speaker and a microphone, neither of which are shown in FIG. 12, to effectuate telephonic communications in examples where device 10 is a mobile wireless telephone or a speaker where device 10 is a media player. Furthermore, the various modules and units shown in device 10 may not be necessary in every example of device 10. For example, user interface 80 and display 82 may be external to device 10 in examples where device 10 is a desktop computer or other device that is equipped to interface with an external user interface or display.

Examples of user interface 80 include, but are not limited to, a trackball, a mouse, a keyboard, and other types of input devices. User interface 80 may also be a touch screen and may be incorporated as a part of display 82. Transceiver module 78 may include circuitry to allow wireless or wired communication between device 10 and another device or a network. Transceiver module 78 may include one or more modulators, demodulators, amplifiers, antennas and other such circuitry for wired or wireless communication.

Display processor 84 may be configured to cause display 82 to display stereoscopic view. There may be various techniques that display processor 84 may utilize to cause display 82 to display stereoscopic view, and aspects of this disclosure may utilize any of these techniques. For example, display processor 84 may retrieve the left-eye image from frame buffer 64, retrieve the right-eye image from frame buffer 64, and interleave the two images together to provide the stereoscopic view.

As another example, display processor 84 may control the refresh rate of display 82. In this example, during each refresh cycle, display processor 84 may cycle between the left-eye image and the right-eye image. For instance, display processor 84 may retrieve the left-eye image from frame buffer 64, expand the left-eye image to the entirety of display 82, and display left-eye image on display 82 for one refresh cycle. Then, for the next refresh cycle, display processor 84 may perform substantially similar functions, but for the right-eye image stored in frame buffer 64. In other words, display 82 may display the left-eye image, then the right-eye image, then the left-eye image, and so forth.

The viewer may be wearing specialized glasses that are synchronized with the refresh rate of display processor 84. For example, while display 82 is displaying the left-eye image, the specialized glasses may shutter close the right lens so that only the left eye of the viewer captures the left-eye image. Then, while display 82 is displaying the right-eye image, the specialized glasses may shutter close the left lens so that only the right eye of the viewer captures the right-eye image, and so forth. If the refresh rate is fast enough, the viewer perceives stereoscopic view where the image pops out of or pushes into display 82 and encompasses a 3D volume.

In some examples, some conventional display processors may not configured to cause display 82 to display stereoscopic view. In these examples, the viewer may couple device 10 to a display that includes a display processor, such as display processor 84, which is configured to cause display 82 to present the stereoscopic view. For example, the viewer may couple device 10 to a stereoscopic view enabled television via transceiver module 78. For instance, the viewer may couple transceiver module 78 to the television via a high-definition multimedia interface (HDMI) wire. In this example, application processor 12 or GPU 20 may instruct transceiver module 78 to transmit the pixel values stored in frame buffer 64 to the display processor of the television. The display processor of this television may then cause the television to display the left-eye and right-eye images to form the stereoscopic view.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, the method comprising:
   receiving, with a graphics processing unit (GPU), first attribute information for a first vertex of a primitive of a first view;
   determining, with the GPU, second attribute information for a second vertex of a corresponding primitive of a second view;
   combining, with the GPU, the second attribute information for the second vertex of the corresponding primitive of the second view with the first attribute information for the first vertex of the primitive of the first view to generate combined attribute information; and
   subsequent to generating the combined attribute information, processing, with the GPU, the combined attribute information to generate graphics data for a stereoscopic view, wherein processing comprises executing a single instance of a vertex shader program on the GPU to process the combined attribute information.

2. The method of claim 1, wherein combining the second attribute information with the first attribute information comprises combining, with a primitive generator of the GPU, the second attribute information with the first attribute information.

3. The method of claim 1, further comprising:
   adding instructions in a vertex shader program code to generate a modified vertex shader program, wherein the instructions added in the vertex shader program code configure the modified vertex shader program to process the combined attribute information,
   wherein executing the vertex shader program comprises executing the modified vertex shader program to process the combined attribute information.

4. The method of claim 1, further comprising:
   determining respective attribute information for respective vertices of corresponding primitives of a plurality of views,
   wherein the combined attribute information includes the respective attribute information for the respective vertices of the corresponding primitives of the plurality of views.

5. The method of claim 1, further comprising:
   determining whether a number of views of the stereoscopic view is less than a threshold, determining whether only a position between the vertex of the primitive of the first view and the vertex of the primitive of the second view is different, or determining whether modifying a vertex shader program code to generate the vertex shader program that is executed requires less time or power consumption over respective thresholds,
   wherein combining the second attribute information with the first attribute information and processing the combined attribute information comprises combining the second attribute information with the first attribute information and processing the combined attribute information in response to the determination that one or more of the number of views of the stereoscopic view is less than the threshold, only the position between the vertex of the primitive of the first view and the vertex of the primitive of the second view is different, or modifying the vertex shader program code to generate the vertex shader program that is executed requires less time or power consumption over respective thresholds.

6. The method of claim 5, further comprising:
in response to the determination that the number of views of the stereoscopic view is greater than the threshold, the determination that not only the position between the vertex of the primitive of the first view and the vertex of the primitive of the second view is different, or the determination that modifying the vertex shader program code to generate the vertex shader program that is executed requires more time or power consumption over respective thresholds:
processing, with the GPU, the first vertex of the primitive of the first view to generate a first set of graphics data for the stereoscopic view; and
processing, with the GPU, the second vertex of the corresponding primitive of the second view to generate a second set of graphics data for the stereoscopic view.

7. A device for processing graphics data, the device comprising:
a memory unit configured to store first attribute information for a first vertex of a primitive of a first view; and
a graphics processing unit (GPU) comprising a shader core, wherein the GPU is configured to:
receive the first attribute information for the first vertex of the primitive of the first view;
determine second attribute information for a second vertex of a corresponding primitive of a second view;
combine the second attribute information for the second vertex of the corresponding primitive of the second view with the first attribute information for the first vertex of the primitive of the first view to generate combined attribute information; and
subsequent to generating the combined attribute information, process the combined attribute information to generate graphics data for a stereoscopic view, wherein the GPU is configured to execute a single instance of a vertex shader program on the shader core to process the combined attribute information.

8. The device of claim 7, wherein the GPU comprises a primitive generator, wherein the primitive generator is configured to combine the second attribute information with the first attribute information.

9. The device of claim 7, further comprising:
a processor configured to add instructions in a vertex shader program code to generate a modified vertex shader program, wherein the instructions added in the vertex shader program code configure the modified vertex shader program to process the combined attribute information when executed,
wherein the GPU is configured to execute the modified vertex shader program on the shader core to process the combined attribute information.

10. The device of claim 7, wherein the GPU is configured to:
determine respective attribute information for respective vertices of corresponding primitives of a plurality of views,
wherein the combined attribute information includes the respective attribute information for the respective vertices of the corresponding primitives of the plurality of views.

11. The device of claim 7, further comprising:
a processor,
wherein one or more of the processor and the GPU are configured to determine whether a number of views of the stereoscopic view is less than a threshold, determine whether only a position between the vertex of the primitive of the first view and the vertex of the primitive of the second view is different, or determine whether modifying a vertex shader program code to generate the vertex shader program that is executed requires less time or power consumption over respective thresholds,
wherein the GPU is configured to combine the second attribute information with the first attribute information and process the combined attribute information in response to the determination that one or more of the number of views of the stereoscopic view is less than the threshold, only the position between the vertex of the primitive of the first view and the vertex of the primitive of the second view is different, or modifying the vertex shader program code to generate the vertex shader program that is executed requires less time or power consumption over respective thresholds.

12. The device of claim 11, wherein, in response to the determination that the number of views of the stereoscopic view is greater than the threshold, the determination that not only the position between the vertex of the primitive of the first view and the vertex of the primitive of the second view is different, or the determination that modifying the vertex shader program code to generate the vertex shader program that is executed requires more time or power consumption over respective thresholds, the GPU is configured to:
process the first vertex of the primitive of the first view to generate a first set of graphics data for the stereoscopic view; and
process the second vertex of the corresponding primitive of the second view to generate a second set of graphics data for the stereoscopic view.

13. The device of claim 7, wherein the device comprises an integrated circuit (IC), and wherein the IC comprises the GPU.

14. A device for processing graphics data, the device comprising:
a memory unit configured to store first attribute information for a first vertex of a primitive of a first view; and
a graphics processing unit (GPU) comprising:
means for receiving the first attribute information for the first vertex of the primitive of the first view;
means for determining second attribute information for a second vertex of a corresponding primitive of a second view;
means for combining the second attribute information for the second vertex of the corresponding primitive of the second view with the first attribute information for the first vertex of the primitive of the first view to generate combined attribute information; and
means for processing the combined attribute information to generate graphics data for a stereoscopic view subsequent to generating the combined attribute information, wherein the means for processing comprises means for executing a single instance of a vertex shader program on the GPU to process the combined attribute information.

15. The device of claim 14, further comprising:
means for adding instructions in a vertex shader program code to generate a modified vertex shader program, wherein the instructions added in the vertex shader program code configure the modified vertex shader program to process the combined attribute information, wherein the means for executing the vertex shader program comprises means for executing the modified vertex shader program to process the combined attribute information.

16. The device of claim 14, further comprising:
means for determining respective attribute information for respective vertices of corresponding primitives of a plurality of views,
wherein the combined attribute information includes the respective attribute information for the respective vertices of the corresponding primitives of the plurality of views.

17. A non-transitory computer-readable storage medium having instructions stored thereon that when executed cause a graphics processing unit (GPU) to:
receive first attribute information for a first vertex of a primitive of a first view;
determine second attribute information for a second vertex of a corresponding primitive of a second view;
combine the second attribute information for the second vertex of the corresponding primitive of the second view with the first attribute information for the first vertex of the primitive of the first view to generate combined attribute information; and
subsequent to generating the combined attribute information, process the combined attribute information to generate graphics data for a stereoscopic view, wherein the instructions that cause the GPU to process instructions that cause the GPU to execute a single instance of a vertex shader program on the GPU to process the combined attribute information.

18. The non-transitory computer-readable storage medium of claim 17, wherein the instructions that cause the GPU to combine the second attribute information with the first attribute information comprise instructions that cause the GPU to combine, with a primitive generator of the GPU, the second attribute information with the first attribute information.

19. The non-transitory computer-readable storage medium of claim 17, further comprising instructions that cause the GPU to:
determine respective attribute information for respective vertices of corresponding primitives of a plurality of views,
wherein the combined attribute information includes the respective attribute information for the respective vertices of the corresponding primitives of the plurality of views.

* * * * *